(12) United States Patent
Volpe

(10) Patent No.: US 10,158,442 B1
(45) Date of Patent: Dec. 18, 2018

(54) RELIABLE PRECISION TIME ARCHITECTURE

(71) Applicant: Amazon Technologies, Inc., Seattle, WA (US)

(72) Inventor: Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 15/377,906

(22) Filed: Dec. 13, 2016

(51) Int. Cl.
*H04J 3/06* (2006.01)
*H04L 7/00* (2006.01)

(52) U.S. Cl.
CPC .......... *H04J 3/0679* (2013.01); *H04J 3/0641* (2013.01); *H04J 3/0688* (2013.01); *H04L 7/0012* (2013.01); *H04L 7/0083* (2013.01)

(58) Field of Classification Search
CPC ...... H04J 3/0635; H04J 3/0679; H04J 3/0638; H04J 3/0641
See application file for complete search history.

(56) References Cited

U.S. PATENT DOCUMENTS

| | | | | |
|---|---|---|---|---|
| 4,736,393 A * | 4/1988 | Grimes | ................ | H04J 3/0679 340/4.2 |
| 6,606,362 B1 * | 8/2003 | Dalzell | ................ | H04J 3/0641 370/294 |
| 2001/0005361 A1 * | 6/2001 | Lipsanen | ............. | H04J 3/0679 370/238 |
| 2005/0135276 A1 * | 6/2005 | Bouchat | ................. | H04L 45/00 370/256 |
| 2008/0205294 A1 * | 8/2008 | Brune | ................... | H04J 3/0641 370/254 |
| 2009/0122782 A1 * | 5/2009 | Horn | ..................... | H04J 3/0679 370/350 |
| 2009/0232031 A1 * | 9/2009 | Vasseur | ................ | H04L 12/185 370/256 |
| 2009/0290572 A1 * | 11/2009 | Gonia | .................. | H04J 3/0641 370/350 |
| 2010/0309933 A1 * | 12/2010 | Stark | ................ | G06F 17/30327 370/503 |
| 2011/0002429 A1 * | 1/2011 | Williams | ............. | H04J 3/0632 375/356 |

(Continued)

OTHER PUBLICATIONS

U.S. Appl. No. 15/377,939, filed Dec. 13, 2016, Titled: Distributed Precision Time Architecture.

(Continued)

*Primary Examiner* — Gary Mui
(74) *Attorney, Agent, or Firm* — Kilpatrick Townsend & Stockton LLP

(57) ABSTRACT

Provided are systems and methods for a reliable precision time architecture in a network. In various implementations, the network can be configured with a first time synchronization tree, the first time synchronization tree providing a first network time to network devices in the network. Each network device can further synchronize to the first network time. The network can further be configured with a second time synchronization tree. The second time synchronization tree can provide a second network time to the network devices on the network. The network devices can also synchronize to the second network time. The network devices can further be configured to use the first network time as a current time.

22 Claims, 18 Drawing Sheets

(56) References Cited

U.S. PATENT DOCUMENTS

| | | | |
|---|---|---|---|
| 2011/0080985 A1* | 4/2011 | Secker | H03L 7/18 375/376 |
| 2012/0287948 A1* | 11/2012 | Ruffini | H04J 3/0682 370/503 |
| 2013/0094366 A1* | 4/2013 | Lee | H04L 41/14 370/241 |
| 2013/0283174 A1* | 10/2013 | Faridian | H04J 3/0641 715/736 |
| 2015/0318941 A1 | 11/2015 | Zheng et al. | |
| 2016/0065322 A1* | 3/2016 | Cao | H04J 3/0641 370/503 |
| 2016/0197719 A1* | 7/2016 | Wang | H04J 3/0641 709/248 |
| 2016/0277138 A1 | 9/2016 | Garg et al. | |
| 2016/0374043 A1* | 12/2016 | Wetterwald | H04W 56/0045 |

OTHER PUBLICATIONS

Institute of Electrical and Electronic Engineers, "IEEE Standard for a Precision Clock Synchronization Protocol for Networked Measurement & Control Systems," IEEE Std 1588™-2008, New York, New York (Jul. 2008), 289 pages.

* cited by examiner

RELIABLE PRECISION TIME ARCHITECTURE

BACKGROUND

Network devices in a network use time for various purposes. Network devices, including host devices and network infrastructure devices, can use the current time for purposes internal to an individual device, such as for example to apply a timestamp to a file when the file is created or modified, to apply timestamps to searches and other activity in a database, to apply timestamps to activities recorded in log files, and/or to track a current up time (how long the device has been powered on), among other things.

Network devices can also use the current time for external purposes, including inserting timestamps into network packets and attaching timestamps to events that are communicated to the network. A network device can, for example, attach a timestamp to a packet when transmitting the packet. As another example, a network device can extract a timestamp from a packet received from the network, and compare the extracted timestamp against a time being maintained by the network device.

Timestamps can further be used to analyze the performance of a network. For example, timestamps can be used to measure the latency across the network. Latency across the network can be measured, for example, as an average amount of time a packet needed to traverse the network from a source device to a destination device. Timestamps can also, for example, be used to measure packet throughput, that is, the number of packets that can cross the network at a given moment.

Generally, network devices each maintain time individually. A network device can have an internal clock circuit that is driven, for example, by a crystal oscillator. The clock circuit can increment every second, every millisecond, or at some fraction of a second. At any given moment, the clock circuit can provide the current time as a numerical value. The numerical value can then be inserted into file system records, database records, log files, and/or packets.

BRIEF DESCRIPTION OF THE DRAWINGS

Various embodiments in accordance with the present disclosure will be described with reference to the drawings, in which.

DETAILED DESCRIPTION

Figure 1A:
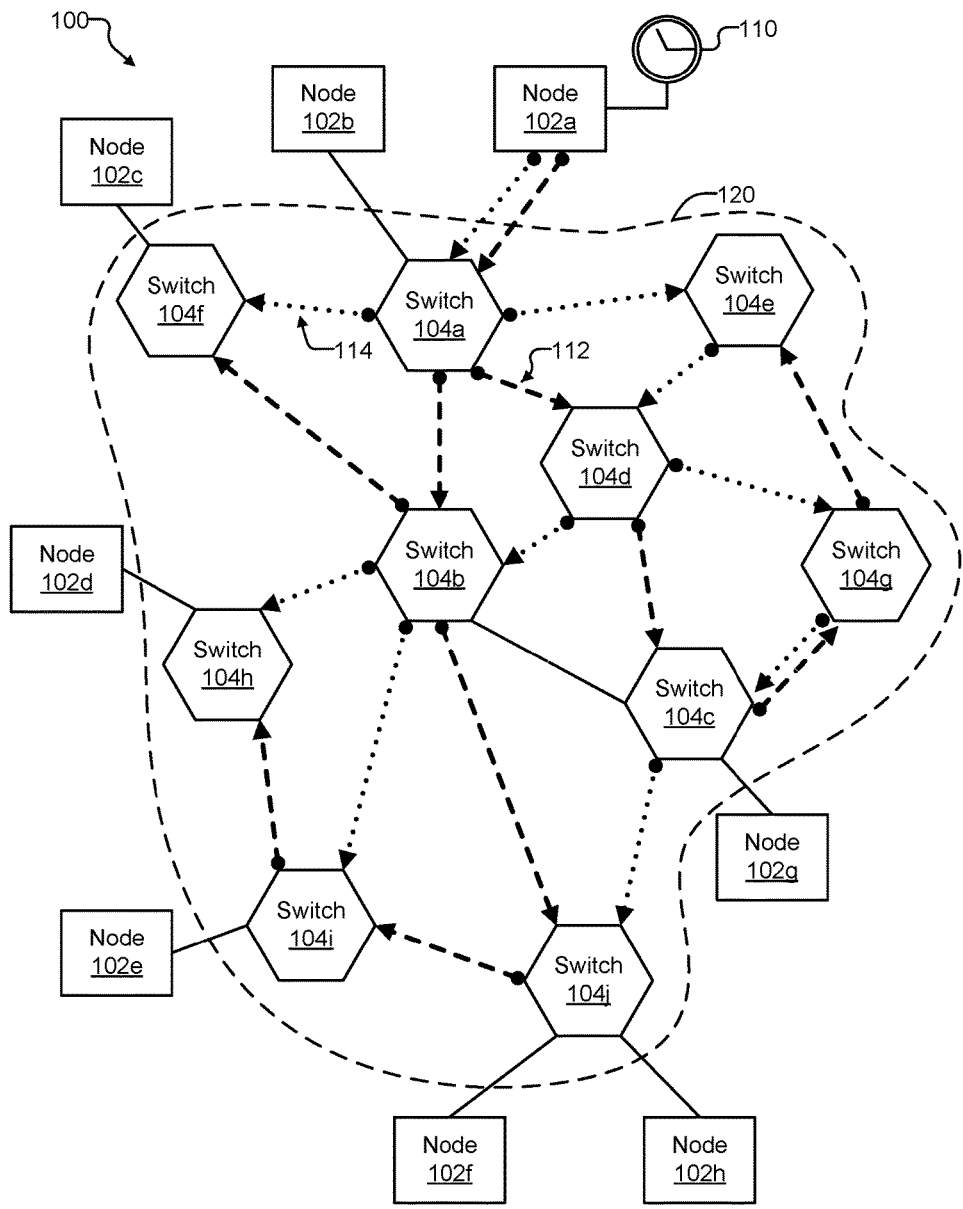
FIGS. 1A-1E illustrate an example of a network in which a reliable precision time architecture can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Network devices in a network use time for various purposes. Time, in this context, means one or more of a year, month, day, hour, minute, second, and/or fraction of a second, where fractions of a second can be provided in milliseconds, nanoseconds, femtoseconds, etc. Network devices, including host devices and network infrastructure devices, can use the current time for purposes internal to an individual device, such as for example to apply timestamp to a file when the file is created or modified, to apply timestamps to searches and other activity in a database, to apply timestamps to activities recorded in log files, and/or to track a current up time (how long the device has been powered on), among other things.

Network devices can also use the current time for external purposes, including inserting timestamps to network packets and attaching timestamps to events that are communicated to the network. A network device can, for example, attach a timestamp to a packet when transmitting the packet. In this example the timestamp can indicate the time at which the network device transmitted the packet. As another example, a network device can extract a timestamp from a packet received from the network, and compare the extracted timestamp against a time being maintained by the network device. The timestamp, in this example, can be used to determine an amount of time it took for the packet to reach the network device.

Timestamps can further be used to analyze the performance of a network. For example, timestamps can be used to measure the latency across the network. Latency across the network can be measured, for example, as an average amount of time a packet needed to traverse the network from a source device to a destination device. Timestamps can also, for example, be used to measure packet throughput, that is, the number of packets that can cross the network at a given moment. Timestamps can thus be useful for monitoring and improving the performance of a network.

Generally, network devices each maintain time individually. A network device can have an internal clock circuit that is driven, for example, by a crystal oscillator. The clock circuit can increment every second, every millisecond, or at some fraction of a second. At any given moment, the clock circuit can provide the current time as a numerical value. In network devices, the numerical value is typically an offset from what is known as the epoch time, which sets time zero at 12:00 am, Jan. 1, 1970.

For timestamps to be meaningful and useful, the time being used by each device in a network should be approximately the same. Approximately the same means that the time maintained by each network device is similar to within an acceptable degree of difference. Differences in time that are outside of the acceptable degree of difference may cause values such as latency and throughput measurements to be inaccurate.

Various time synchronization protocols can be used to synchronize the devices in a network to a common network time. In small networks, where most of the network devices may be directly connected to one another, these time synchronization protocols can synchronize the network devices relatively accurately, such as to within about 100 nanoseconds (ns). In very large networks, however, time synchronization protocols may suffer some deficiencies. For example, time synchronization protocols can be based on distributing the time by organizing the nodes in the network in a tree structure. In this example, when a link or a node in the network fails, the network devices in one branch of the tree structure may no longer be able to synchronize to the network time. While in a small network only a small number of network nodes may be affected, in a large networks many nodes may be affected.

Highly accurate time may be of particular importance in high-performance, high reliability networks. To maintain high performance, network analytics may be constantly monitoring latency and throughput, and the network may be continuously adjusted to relieve congestion, bypass link failures, and/or to manage bursts of dense network traffic. To maintain high reliability, the network may be configured with redundant links, so that, in the best case, all host devices on the network can be reached even when links or nodes in the network fail. In order for timestamps to remain accurate in a high reliability network, time synchronization across the network should also be reliable.

In various implementations, provided is a reliable precision time architecture, which can be used to reliably synchronize the devices in a network to a common network time. In various implementations, the reliable precision time architecture includes configuring multiple time synchronization trees for a network. A time synchronization tree, which may also be referred to as a time domain, can be used to distribute the network time to each device in the network. The network can be configured with a primary time synchronization tree and one or more backup time synchronization trees. Should a link or node used by the primary time synchronization tree to distribute the network time fail, all or part of the network can change over to using paths described by a backup time synchronization tree. Using paths in the backup time synchronization tree, time can continue to be distributed to network devices that would otherwise—due to the link or node failure—not be able to receive the network time.

In various implementations, a reliable precision time architecture can also include a network device that can be configured to support multiple time synchronization trees. In various implementations, each port of the network device can individually maintain a port time. The network device can, at a first port, receive a first network time from a neighboring device. The network device can synchronize the port time at the first port to the first network time. The first port can further be configured to provide its port time through a first set of ports to other neighboring devices. The first port and the first set of ports can thus form a first time synchronization tree, inside the network device. The network device can further receive a second network time— which may be the same or different from the first network time—at a second port, which can synchronize its port time to the second network time. The network device can configure the second port to provide its port time through a second set of ports to neighboring network devices, which forms a second time synchronization tree internal to the network device. Using these and possibly other internal time synchronization trees, the network device can simultaneously synchronize to two or more network times.

In various implementations, the network device can further maintain a device local time. The network device can use the device local time for various internal and external purposes. The device local time can be maintained in a distributed fashion, with the network device including device local time unit in each circuit that uses the current time. In various implementations, the network device can synchronize its device local time to the network time being provided by a first time synchronization tree, for example by synchronizing to a port time of a port that is receiving the network time. At some point in time, the network device can determine to change over to using a second time synchronization tree. At such a time, the network device can also synchronize the device local time to the time provided by the second time synchronization tree instead of the first.

FIGS. 1A-1E illustrate an example of a network 100 in which a reliable precision time architecture can be implemented. The example network 100 includes a switch fabric 120, through which multiple nodes 102a-102g can communicate with one another. The nodes 102a-102g can be, for example, server computers, data storage arrays, personal computing devices, and/or printers or other peripheral devices, among other things. The nodes 102a-102g can use one or more network protocols to transmit packets across the switch fabric 120. Though only a small number of nodes 102a-102g are illustrated in this example network 100, other example networks can include thousands or hundreds of thousands of nodes.

A switch fabric, which may also be referred to as a switching fabric, can include multiple interconnected network infrastructure devices. In the illustrated example, the switch fabric 120 is illustrated with multiple switches 104a-104j. In other examples, the switch fabric 120 can include a combination network infrastructure devices, including switches, routers, hubs, and/or repeaters, as well as gateway devices that can connect the network 100 to other networks. Though only a few switches 104a-104j are illustrated, a switch fabric can include thousands or hundreds of thousands of switches and/or other network infrastructure devices.

In various implementations, the nodes 102a-102g can be connected to switches 104a-104j at the boundary or edges of the switch fabric 120. The switches 104a-104j may each have multiple connections to other switches 104a-104j within the switch fabric 120, such that there can be multiple paths from one node 102a-102g to another node 102a-102g across the switch fabric 120. In various implementations, packets from one node 102a-102g to another node 102a-102g can be sent using different paths in the switch fabric 120. Doing so can be beneficial for achieving high throughput and low latency, in that the packets can travel over the shortest path and/or the least congested path. The multiple paths can also be beneficial for reliability, in that, should a link between any two switches 104a-104j fail, packets can use a different link to reach the same destination.

As discussed above, each node 102a-102g and each switch 104a-104j in the example network 100 may individually be maintaining the current time, including a date, hour, minute, second, and/or fraction of a second. The time being maintained internally by an individual device will be referred to herein as the device time or device local time. Each node 102a-102g and switch 104a-104j may be using a device local time for internal purposes, such as for counters, alarms, and/or displaying a clock. Each node 102a-102g and switch 104a-104j may also be using a device local time for external purposes, such as attaching timestamps to transmitted packets or comparing timestamps in received packets to the current time. The individual devices can also be using a device local time to assign timestamps to events occurring in the network 100, such as link failures, new links being established, snapshots of network statistics, and so on.

For timestamps being passed around the network 100 to be meaningful, the device time of each node 102a-102g and switch 104a-104j should be synchronized to a common time, which will be referred to herein as the network time. Assume, for example, that the device time at a first node 102b is a few seconds ahead of the device time at a second node 102e. In this example, when the second node 102e receives a packet from the first node 102b, a timestamp in the packet will include those few seconds, and thus it may seem, at the second node 102e, that the packet arrived faster than it really did. To provide a more concrete example, the packet can be transmitted by the first node 102b when the time at the first node 102b is 10:00:05 and the time at the second node 102e is 10:00:00. The packet may arrive at the second node 102e when the time at the second node 102e is 10:00:10 and the time at the first node 102b is 10:00:15. In this example, according to the time at the first node 102b, the packet took ten seconds to reach the second node 102e, but according to the time at the second node 102e, the packet took five seconds to arrive.

Confusion over the time can be compounded as a packet traverses the switch fabric 120. For example, each switch 104a-104j may attach a timestamp to a packet, which can be used to trace a packet's route through the switch fabric 120. A packet transmitted by a first node 102b may pass through switch 104a, switch 104b, and switch 104i to reach a second node 102e. Another packet from the first node 102b can pass through switch 104a, switch 104d, switch 104c, switch 104j, and switch 104i to reach the second node 102e, which, though a longer route, may be a faster route because of congestion along the other route. Without synchronized time across the switch fabric 120, understanding the different latency across these paths may be difficult.

Thus, in various implementations, the example network 100 can be configured with time synchronization trees, where each time synchronization tree defines a different time domain. In various implementations, by the network 100 can use the time synchronization trees to synchronize each device in the network to a common, network time. FIG. 1A illustrates an example where the network 100 includes a first, or primary, time synchronization tree 112, indicated using dashed lines. In this example, the network 100 also includes a second, or backup, time synchronization tree 114, indicated using dotted lines. The time synchronization trees 112, 114 use the existing network links used by the switches 104a-104j to transfer network traffic, and do not require special or dedicated network links. Thus, in the illustrated example, the paths in the time synchronization trees 112, 114 have been illustrated as overlaying the network links in the switch fabric 120. The time synchronization trees 112, 114 can be configured for the network 100 using a network configuration device, discussed further below.

Using a tree structure to distribute the network time to the network 100 ensures that, for any given device in the network, only one neighboring device (the parent vertex in the tree) will be providing the time to the given device (a child vertex in the tree). Neighboring, in this context, describes devices that share a network link, such as switch 104a and switch 104d. Having more than one device provide the network time may create an ambiguity as to which provider's time is the correct time. A given device itself can be the time provider for multiple other devices, so that the time can be distributed across the network 100 quickly.

In primary synchronization tree 112, the node 102a has been designated as the master time keeper, and functions as the root of the primary synchronization tree 112. A master time keeper provides the network time to the network 100. Any device that is able to maintain a time, including network infrastructure devices, can be a master time keeper. For example, one of the switches 104a-104j may be providing the network time. In this example, in some implementations, the master time keeper switch may provide the time from a local processor, discussed further below.

In some implementations, the node 102a that is designated as the master time keeper can use its own device local time as the network time. Alternatively or additionally, in some implementations, the node 102a can include or be connected to a clock source 110. The clock source can be, for example, an atomic clock or a satellite navigation system receiver, such as a Global Positioning System (GPS) receiver, which can obtain the time from a satellite system. The clock source can otherwise be some other device capable of keeping or obtaining the time. The clock source 110 may provide the time with a higher degree of precision than the node's 102a internal clock may be capable of.

Alternatively or additionally, in some implementations, the node 102a may receive the network time from a control plane, which can be local or can be remote to the node 102a itself. The control plane is the part of a network that carries signaling traffic and is responsible for routing. Functions of the control plane include system configuration and management. The control plane, the data plane, and the management plane are the three basic components of a telecommunications architecture. The control plane and management plane serve the data plane, which bears the traffic that the network exists to carry. The management plane, which carries administrative traffic, is considered a subset of the control plane Each of the switches 104a-104j further function as vertices in the tree structure, for purposes of distributing the network time. The branches of the tree structure provide paths, over existing network links, from the master time keeper node 102a to each switch 104a-104j in the switch fabric 120. Each path has been determined such that there is a single path from the node 102a to each switch 104a-104j, in accordance with the tree structure. For example, the node 102a is connected to the switch 104a. From the switch 104a, the primary synchronization tree 112 includes one path to switch 104b and one path to switch 104d. From switch 104b, there is a path to switch 104f and a path to switch 104j. From switch 104j, there is a path to switch 104i and then switch 104h. Returning to switch 104d, from this switch 104d there is a path to switch 104c, then to switch 104g, and then to switch 104e.

Each of the switches 104a-104j in the switch fabric 120 can use the paths provided by the primary synchronization tree 112 to synchronize to the network time. Using, for example, time synchronization protocols (discussed further below), the master time keeper node 102a can synchronize the time with its attached switch 104a. The switch 104a can further synchronize with neighboring switches 104b, 104d, as designated by the primary time synchronization tree 112. These switches 104b, 104d can then synchronize with their neighboring switches 104c, 104f, 104j, and so on until the end of each path in the primary time synchronization tree 112 is reached. The nodes 102b-102g in the network 100 can further synchronize with the switch 104a, 104f, 104h, 104i, 104*j* to which each node 102*b*-102*g* is connected. In this way, each node 102*a*-102*g* and each switch 104*a*-104*j* can obtain the network time.

The network 100 can be configured to use various methods to synchronize the network time across the network 100. These methods generally involve an exchange of network packets between a network device acting as a time provider, also referred to as a time source or master, and a network device acting as time recipient, also referred to as a time destination or slave. Using the network packets, the time provider and the time recipient can determine a difference between the time being kept by each device. The time recipient can then use the difference to adjust its time to be approximately the same as the time of the time provider. Generally, the time at the time recipient matches the time of the time provider within a certain degree of accuracy, such as within a millisecond or within a nanosecond, or within some other fraction of a second. Various time synchronization protocols can provide varying degrees of accuracy. For example, in a local area network, the Network Time Precision (NTP) protocol can match the time between the time provider and the time recipient to within one millisecond (ms) or less. As another example, Precision Time Protocol (PTP) can achieve accuracy to within a less than a microsecond (μp). Time synchronization protocols are discussed further below with respect to FIG. 3.

In the example of FIG. 1A, each switch 104*a*-104*j* and/or each port of a switch can be a time provider, and each switch 104*a*-104*j* and/or each port of a switch can be a time receiver. Ports from which time is being provided are illustrated using dots, and ports at which time is being received are illustrated using arrowheads. For example, in the first time synchronization tree 112, the switch 104*a* is the time provider for switches 104*b* and 104*d*. Similarly, switch 104*b* provides the time to switch 104*f* and switch 104*j*, and switch 104*d* provides the time to switch 104*c*, and so on.

Time synchronization typically occurs periodically. The network 100 may synchronize the entire network 100 more frequently when the network is initially brought up, so that each device in the network 100 can converge to the common, network time. Once the network time has been established at each device, the network 100 can synchronize less frequently, to maintain the network time across the network 100. Small differences in the internal clocks of each device may cause the device local times of each device to gradually differ, or drift, from one another. The network 100 can thus be configured to synchronize all the devices to the network time at regular intervals. In some implementations, synchronization can also be triggered when a new device is added to the network. In these implementations, the entire network 100 may be resynchronized, or only devices in the neighborhood of the new device may be synchronized. Synchronization of the whole network 100 or in the area of the new device may be more frequent for a short period, until the new device, and any devices receiving the network time from the new device have received the network time.

The primary time synchronization tree 112 may be adequate for distributing the network time across the network 100, particularly when the network 100 is relatively small. Network link failures, or a switch going offline, can be problematic for time synchronization, but the impact in a small network may be acceptable. For example, when a network link fails in a small network, it may be that only a few devices in the network can no longer synchronize to the network time. Additionally, a small network may be able to tolerate a little less time accuracy while the link failure is fixed, since, there may be few devices, few network links, and/or less concern over the latency and throughput of the network.

When the network 100 is very large, however, a single link failure may cause a large part of the network 100 to be disconnected from the network time. Ordinary network traffic may suffer little disruption, since the network traffic can take a route through the network that bypasses the failed link. But, in a tree structure, because each network device has only one path to the master time keeper, once a network link is fails, all paths connected through that link are affected.

Thus, in various implementations, the network 100 includes the second, backup time synchronization tree 114. In this example, the backup time synchronization tree 114 also includes the node 102*a* as the master time keeper. As discussed further below, in other examples, a backup time synchronization tree can have a different master time keeper. The backup time synchronization tree 114 further includes alternate paths through the network, such that a link failure in a path used by the primary time synchronization tree should not affect the alternate paths in the backup time synchronization tree 114. In the illustrated example, from the switch 104*a*, alternate paths lead to switch 104*e*, and switch 104*f*. From switch 104*e*, the backup time synchronization tree 114 further includes alternate paths to switch 104*b* and 104*g*. From switch 104*b*, alternate paths lead to switch 104*h* and 104*i*. From switch 104*g*, an alternate path leads to switch 104*c* and then to switch 104*j*. As in the primary time synchronization tree 112, for each switch 104*a*-104*j*, there is one alternate path from the switch to the master time keeper node 102*a*. In some cases, the backup time synchronization tree 114 may share a network link with the primary time synchronization tree 112, as is illustrated by the link between switch 104*c* and switch 104*g*. In various implementations, such shared links may be selected to minimize the cost (e.g., the extent of the network 100 that becomes unreachable for time synchronization purposes) should the shared link fail.

To ensure minimal disruption to time synchronization, the backup time synchronization tree 114 exists concurrently with the primary time synchronization tree 112. Additionally, each device in the network 100 can simultaneously synchronize to both the primary time synchronization tree 112 and the backup time synchronization tree 114, so that the network time provided by either time synchronization tree 112, 114 is available to each device. In various implementations, each device in the network 100 can independently determine to obtain the time from one or the other time synchronization tree 112, 114. In some implementations, when the network 100 first powers on, or when a network device is first added to the network, the devices in the network 100 may be configured to use the network time provided primary time synchronization tree 112 while continuing to synchronize to both time synchronization trees 112, 114. As discussed below, as events occur in the network 100, some devices may determine to use the backup time synchronization tree 114 instead. When a network device uses the network time, the network device can use the network time for internal and/or external purposes, as discussed further below.

In various implementations, the network 100 can be configured with a second or third or some other number of additional backup time synchronization trees. Each backup time synchronization tree can use different paths through the network 100, such that, for any link failure, an alternate tree can be available.

In various implementations, the primary 112 and backup 114 time synchronization trees, and any additional time synchronization trees, can be determined and configured in an automated fashion. As noted above, the switch fabric 120 can include thousands or hundreds of thousands of switches. As also noted above, in the best case, the backup time synchronization tree 114 uses network links that are not used by the primary time synchronization tree 112, or uses a minimum number of links used by the primary time synchronization 112, or shares links in a manner that minimizes the cost should a shared link fail.

To determine the best paths through the switch fabric 120 that satisfy these requirements, the network 100 can include a network configuration device. The network configuration device can include a processor and memory for storing and executing program instructions. The program instructions can include instructions for collecting information about the configuration of the network 100 (e.g., how many devices there are, how the devices are connected to each other, the type of each device, etc.). The program instructions can further include instructions for determining the primary time synchronization tree 112 and one or more backup time synchronization trees 114 according to parameters such as minimizing overlapping paths. The program instructions can further include instructions for configuring the switches 104a-104j in the switch fabric 120 according to each time synchronization tree 112, 114, as well as for configuring which time synchronization tree 112 114, is currently in use. The network configuration device can configure and control the switches 104a-104j, for example, by sending control packets over the network 100.

In various implementations, the network configuration device can be embodied in a peripheral device connected to a node 102a-102g or switch 104a-104j in the network 100. Alternatively or additionally, the network configuration device can be embodied in a node 102a-102g, in a switch 104a-104j, or in some other network infrastructure device, such as a network controller.

In various implementations, the network configuration device can further dynamically modify the time synchronization trees 112, 114 as the configuration of the network 100 changes. For example, devices can be added to the network or may be removed from the network, or device may fail or otherwise go offline. New devices can be integrated into both time synchronization trees 112, 114, so that the new devices can be synchronized to the network time provided by both time synchronization trees 112, 114. When devices are removed from the network, the network configuration device can cause the network to start using another time synchronization tree, so that any devices receiving time (directly or indirectly) from a removed device can still be synchronized. The network device may further determine whether the removed devices are permanent changes, and if so, determine new time synchronization trees to accommodate the change.

Figure 1B:
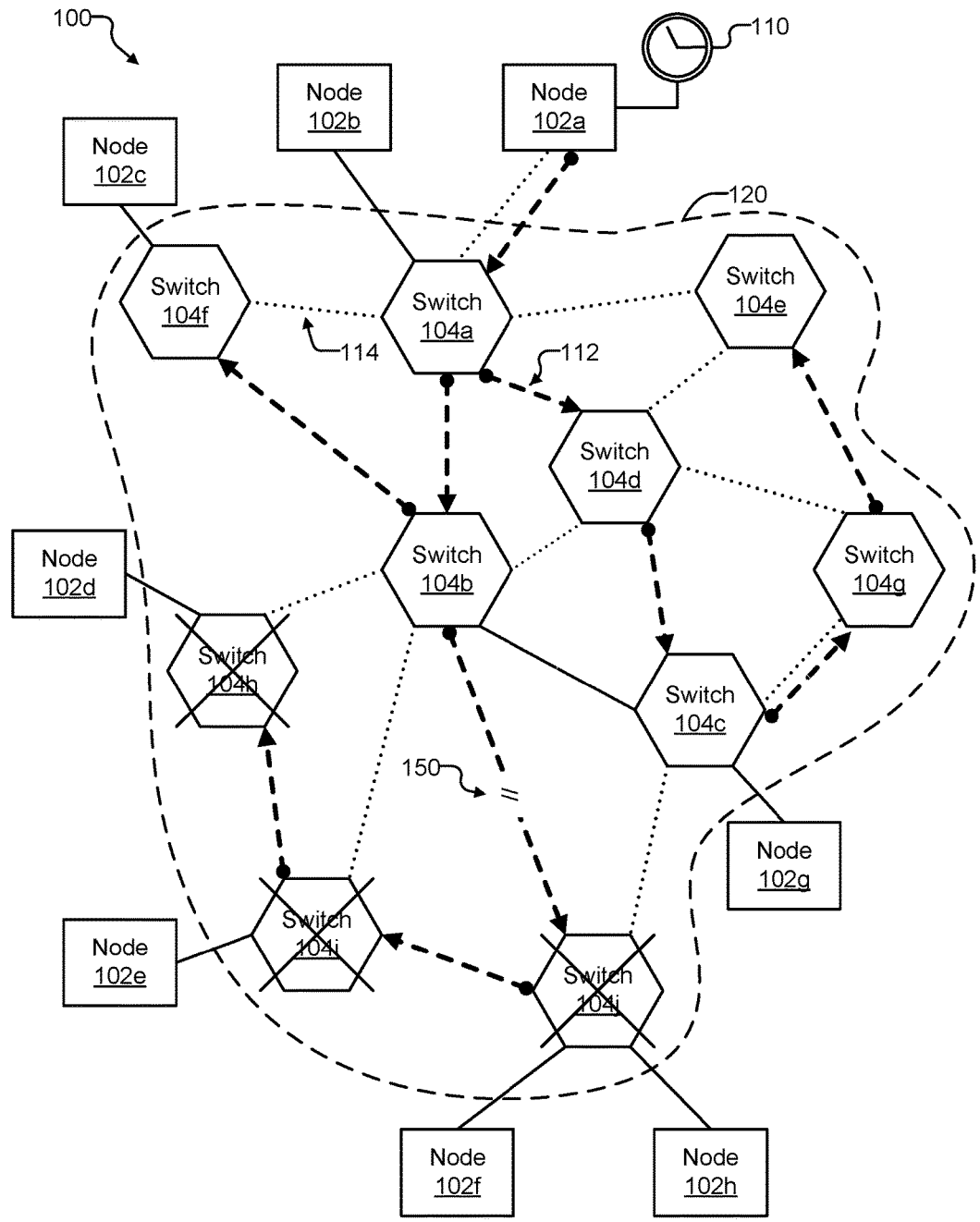

When devices are removed from the network 100, or when a link failure occurs, in some implementations the devices in the network can alternatively or additionally independently determine to use the time from a different time synchronization tree. FIG. 1B illustrates an example where there has been a link failure 150 of a network link that is used by the primary time synchronization tree 112. In the example of FIG. 1B, prior to link failure 150, each of the devices in the network 100 had been using the network time provided by the primary time synchronization tree 112. Though a network time is simultaneously available from either the primary 112 or the backup 114 time synchronization tree, the devices in the network 100 may be, for example, in a default mode of operation, and/or may have each been configured to use the network time from the primary time synchronization tree 112.

In this example, the link failure 150 has occurred between the switch 104b and the switch 104j. The network link may have failed for a variety of reasons, or a combination of reasons. For example, a physical medium (e.g. a cable, connector, socket, etc.) connecting the switch 104b to the switch 104j may have broken, been unplugged, or otherwise have ceased functioning. As another example, one or the other switch 104b, 104j may have stopped using the port to which the network link is connected, for example because of an accumulation of errors or because the switch 104b, 104j, was misconfigured. In any of these examples, network traffic, including packets used to synchronize the time, can no longer pass between the switch 104b and the switch 104j over the failed link. Packets, other than time synchronization messages, can bypass the link failure 150, for example by going through the switch 104c or the switch 104i As noted above, the switch 104b is the time provider to the switch 104j. While ordinary network traffic can use other links to reach the switch 104j from the switch 104b, time synchronization messages cannot. Thus, the switch 104j is unable to continue to synchronize to the network time. Additionally, the switch 104j provides the time to the switch 104i, and the switch 104i provides the time to the switch 104h. While the switch 104h can continue synchronizing with the switch 104i, and the switch 104i can continue synchronizing with the switch 104j, all three switches 104h, 104i, 104j, and the nodes 102d, 102e, 102f, 102h attached to these switches 104h, 104i, 104j, are now dependent on the time being kept by the node 104j. The time being kept by the node 104j may gradually drift away from the network time. Thus, though the affected switches 104h, 104i, 104j and nodes 102d, 102e, 102f, 102h, may be in sync with each other, the switches 104h, 104i, 104j and nodes 102d, 102e, 102f, 102h will no longer synchronized with the network time.

Figure 1C:
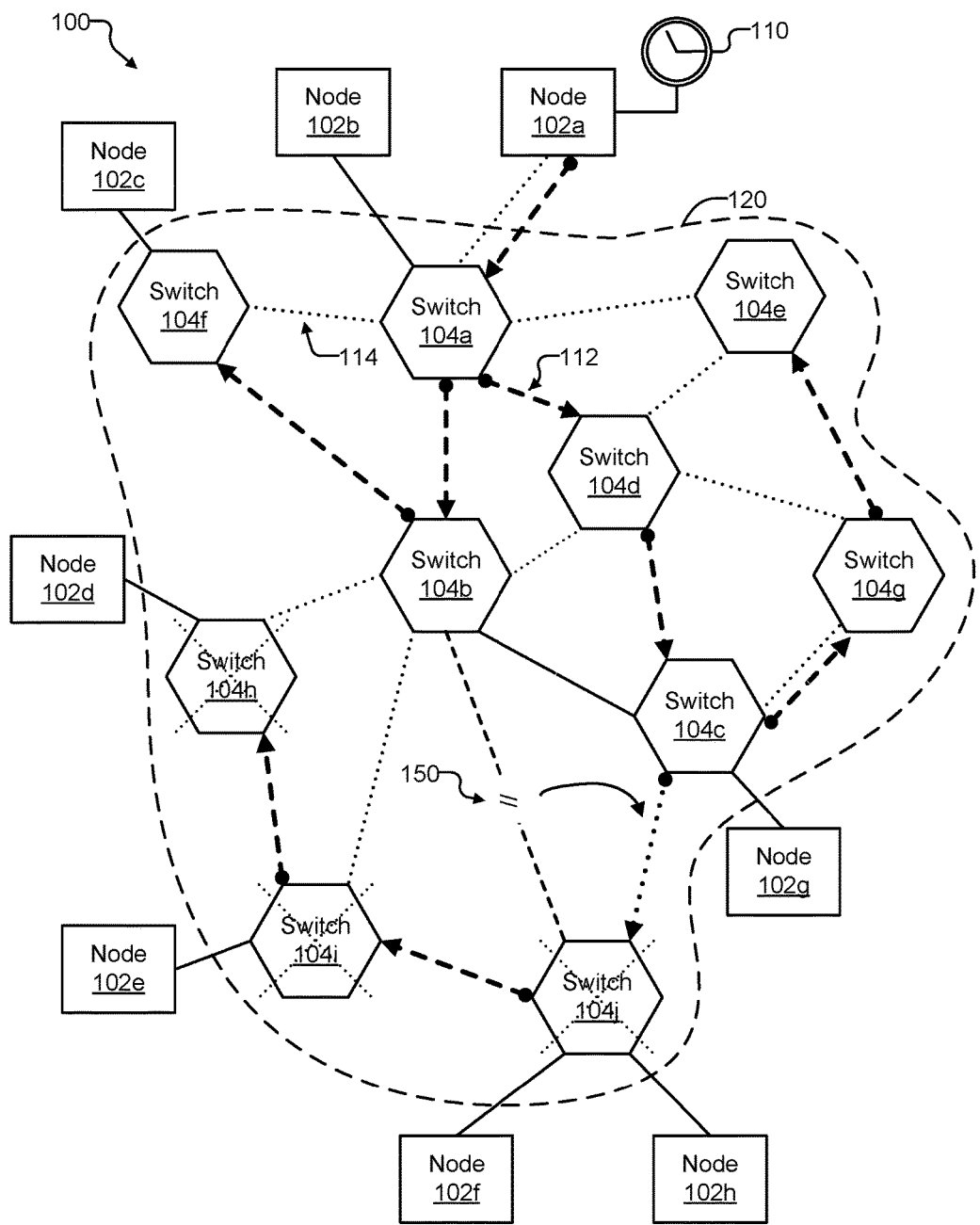

FIG. 1C illustrates an example where the switch 104j has independently and autonomously determined to use the network time from the backup time synchronization tree 114 instead of the primary time synchronization tree 112 after the link failure 150 occurred. As discussed above, each device in the network 100 can synchronize to the time provided by both time synchronization trees 112, 114, though a device may only be using the time provided by one time synchronization tree. For example, prior to the link failure, the switch 104j was using the network time provided by the primary time synchronization tree 112, which the switch 104j was receiving from the switch 104b.

Once the link failure occurs, the switch 104j can determine that the link with the switch 104j is no longer available. This determination can affect packet routing decisions made by the switch 104j, and can also indicate to the switch 104j that the switch 104j should use the network time provided by another switch. For example, the switch 104j may be configured to expect time synchronization messages over link with the switch 104b at pre-determined intervals. When the interval expires and the switch 104j does not receive time synchronization messages from the switch 104b, the switch 104j may automatically start using the network time provided by the backup time synchronization tree. In some implementations, the switch 104j may first verify that the link 150 is no longer available, and/or confirm that the switch 104j can no longer obtain the network time from the switch 104b.

In various implementations, once the switch 104*j* has determined that it can no longer obtain the network time from the switch 104*b*, the switch 104*j* can use the readily-available network time provided by the switch 104*c* instead. In various implementations, the switch 104*j* can include a processor or other hardware, and/or software that manages time synchronization for the switch 104*j*. In these implementations, the hardware and/or software can internally reconfigure the switch 104*j* to use the alternate network time provided by the backup time synchronization tree 114. Once reconfigured, the switch 104*j* can use this alternate network time for internal and/or external purposes.

The switch 104*j* can also use the network time provided by the backup time synchronization tree as the network time the switch 104*j* provides to other devices in the network 100. Prior to the link failure 150, the switch 104*j* was providing, as a vertex in the primary time synchronization tree 112, the network time to the nodes 102*h*, 102 and to the switch 104*i*. After the switch 104*j* has changed over to using the network time provided by the backup time synchronization tree 114, the switch 104*j* can now provide this alternate network time to the nodes 102*h*, 102*f* and the switch 104*i*. As noted above, after the link failure 150, the switch 104*h* and the switch 104*i* also become disconnected from the network time. In this example, however, the switches 104*h*, 104*i* need do nothing to reconnect to the network time, since the switch 104*i* can rely on the switch 104*j* to continue providing the network time, and the switch 104*h* can continue to receive the network time from the switch 104*i*. In most cases, the switches 104*h*, 104*i* may not even have been aware that the link failure 150 disconnected them from the network time.

Figure 1D:
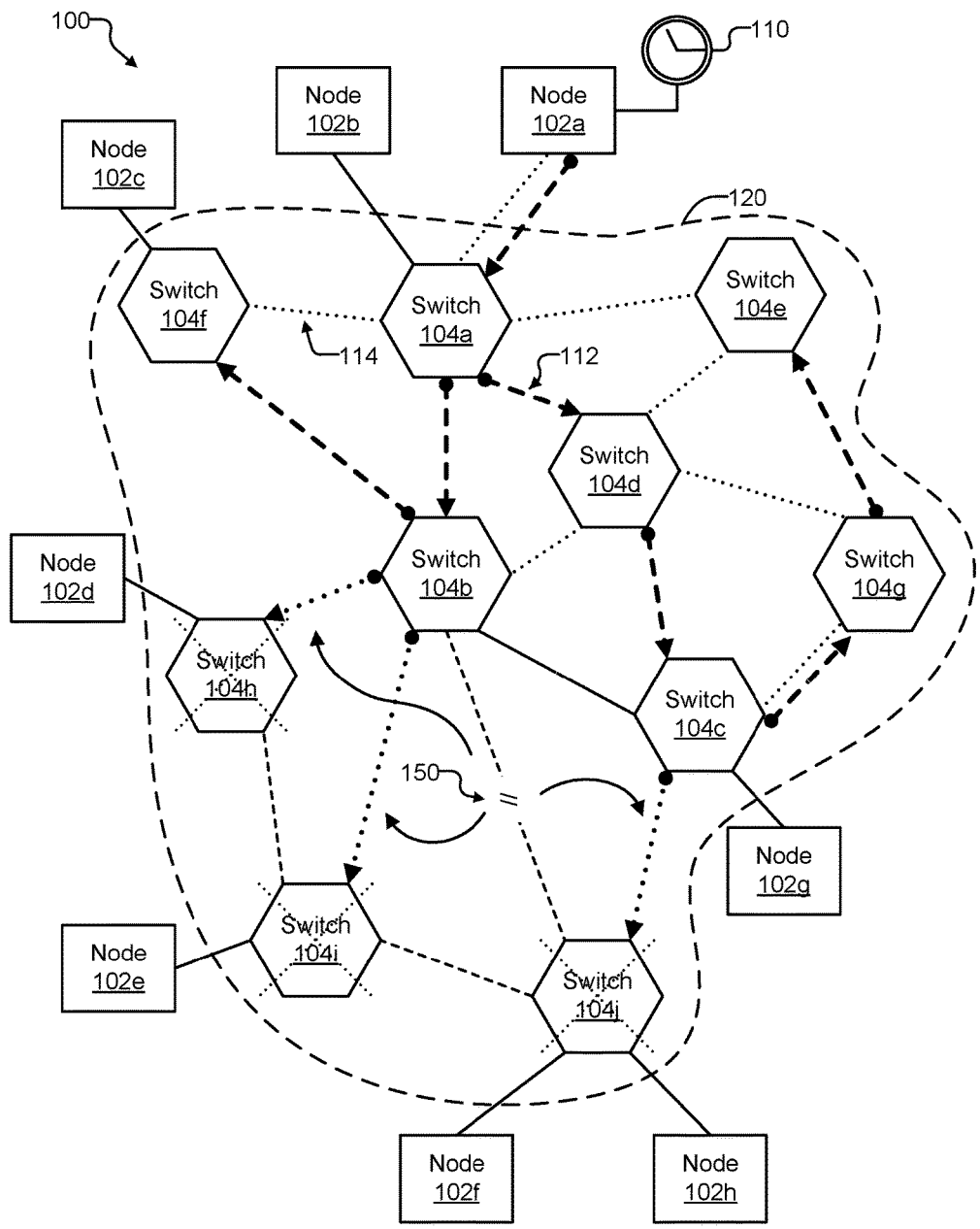

In some implementations, however, after the link failure 150 occurs, the switch 104*j* may determine to stop providing the network time over links that are associated with the primary time synchronization tree 112. FIG. 1D illustrates an example where the switch 104*j* has itself stopped providing the time using the primary time synchronization tree 112. The switch 104*j* may have done so, for example, because the network 100 was configured to isolate the switch 104*j* upon the failure of this particular link. As another example, the network 100 may have been configured progressively change devices in the network 100 to using the network time provided by the backup time synchronization tree 114, so that the primary time synchronization tree 112 can be reconfigured to bypass the link failure 150, and/or so that an additional backup time synchronization tree can be configured.

In this example, the primary time synchronization tree 112 remains active for devices not affected by the link failure 150. For example, the switches 104*a*-104*g* can continue to use the network time provided by the primary time synchronization tree 112. Because the switch 104*j* stops providing the time over the link to switch 104*i*, however, the switch 104*i* will no longer receiving the network time from the primary time synchronization tree 112. The link between the switches 104*i*, 104*j* remains up, and the switches 104*i*, 104*j* can continue to exchange packet traffic. But, in the illustrated example, the switch 104*j* ceases transmitting messages related to time synchronization. The switch 104*i* may thus also determine to start using the network time provided by the backup time synchronization tree 114.

In other situations, there may be reasons other than the link failure 150 why the switch 104*j* stops providing the network time to the switch 104*i*. For example, the switch 104*j* may be overloaded, and thus may not be able to generate time synchronization messages at the intervals expected by the switch 104*i*. In this example, the switch 104*i* may not be able to rely on the switch 104*j* to reliably provide the network time. As another example, functions such as the provision of time may be disabled for the switch 104*j*, in advance of the switch 104*j* being taken offline.

In these and other examples, when the switch 104*i* determines that the switch 104*j* is no longer providing the network time, the switch 104*i* can use the readily available network time provided by the backup time synchronization tree 114. In the illustrated example, this means that the switch 104*i* obtains the network time from the switch 104*b*. The switch 104*b* need not make any changes, since the switch 104*b* is already synchronizing to the network time provided by the backup time synchronization tree 114.

In the illustrated example, the switch 104*i* has also been configured to, upon changing over to using the network time provided by the backup time synchronization tree 114, stop providing the network time over links associated with the primary time synchronization tree 112. For example, as noted above, the network 100 may have been configured to locally stop using the primary time synchronization tree 112. For example, in the illustrated example, failure of the particular link between the switch 104*b* and the switch 104*j* affects three switches and four nodes. Hence, when the link fails, then network 100 may be configured to use the more robust configuration provided by the backup time synchronization tree 114.

When the switch 104*h* determines that the switch 104*i* is no longer providing the network time, the switch 104*h* can instead use the network time provided by the backup time synchronization tree 114, which is provided by the switch 104*b*.

Figure 1E:
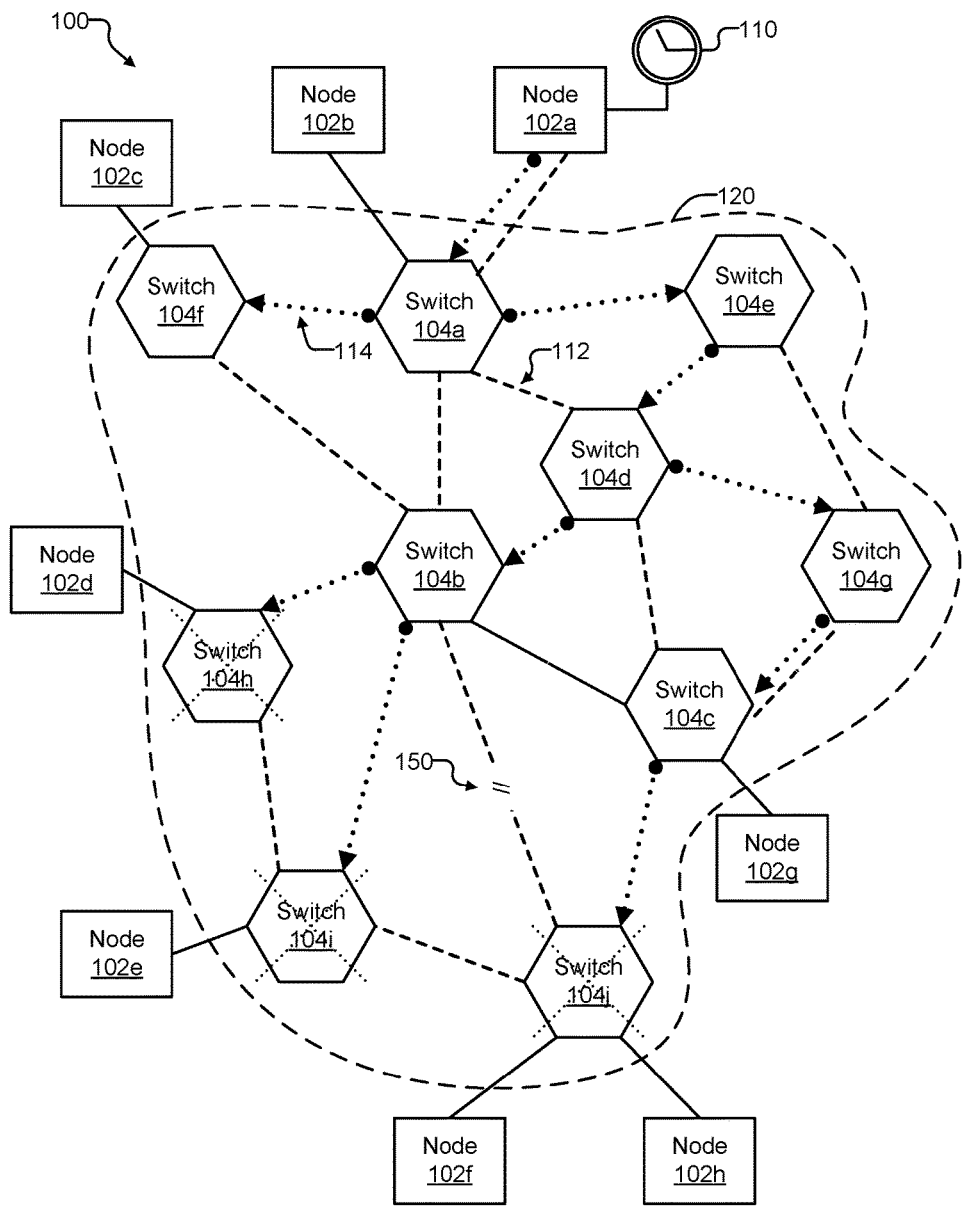

In various implementations, when the link failure 150 occurs, the network 100 may be configured to change all the device in the network over to the backup time synchronization tree 114. FIG. 1E illustrates an example where, as a result of the link failure 150, the devices in the network are using the network time provided by the backup time synchronization tree 114. In various implementations, the primary time synchronization tree 112 remains active and available, and each device, other than the switch 104*j*, can continue to synchronize to the network time provided by the primary time synchronization tree 112. The devices can also, at some future time, change back to using the network time provided by the primary time synchronization tree 112. In some implementations, the primary time synchronization tree 112 can become inactive so that, for example, the primary time synchronization tree 112 can be reconfigured to bypass the link failure 150.

The link failure 150 can trigger changing from the network time of primary time synchronization tree 112 to the network time of backup time synchronization tree 114 in various ways. For example, when the network link goes down, various alerts may be triggered, for example by the switches 104*b*, 104*j* adjacent to the link failure 150. In some implementations, one or more of these alerts can reach a network configuration device that is tasked with maintaining time synchronization trees. The network configuration device can subsequently inform the switches 104*a*-104*j* to start using the network time from the backup time synchronization tree 114, for example by sending broadcast messages to the network. Upon receiving such a message, each switch 104*a*-104*j* can reconfigure itself to use the backup network time instead of the primary network time. In various implementations, each switch 104*a*-104*j* may have a processor, or other hardware, and/or software that is able to modify operations of the switch 104*a*-104*j* that related to the synchronization of time.

Alternatively or additionally, when the link failure 150 occurs, in some implementations the switches 104a-104j can autonomously disable the primary time synchronization tree 112. For example, the switch 104b, having determined that the network link to the switch 104j is no longer available, can stop responding to time synchronization messages from switch 104a, its time provider in the primary time synchronization tree 112. Upon finding that the switch 104b does not respond to time synchronization messages, the switch 104a can stop providing the time to both the switch 104b and the switch 104d (both time recipients of the switch 104a in the primary time synchronization tree 112). The disabling of the primary time synchronization tree 112 can thus progress from switch to switch until none of the switches 104a-104j are using the primary time synchronization tree 112. The switch 104j, for example, having determined that the network link to the switch 104b is no longer available, can expect to eventually receive time synchronization messages over the link to the switch 104c. In various implementations, the switches 104a-104j may have a processor, or other hardware, and/or software that can detect the link failure, and change the ports that switch 104a-104j uses to provide the time.

Once the primary time synchronization tree 112 is no longer being used by the network 100, the primary time synchronization tree 112 can be reconfigured and reactivated, possibly as a new backup time synchronization tree. Alternatively or additionally, entirely different backup time synchronization trees can be configured and activated in the network, and provide backup network times simultaneously with the network time provided by the backup time synchronization tree 114.

Figure 2:
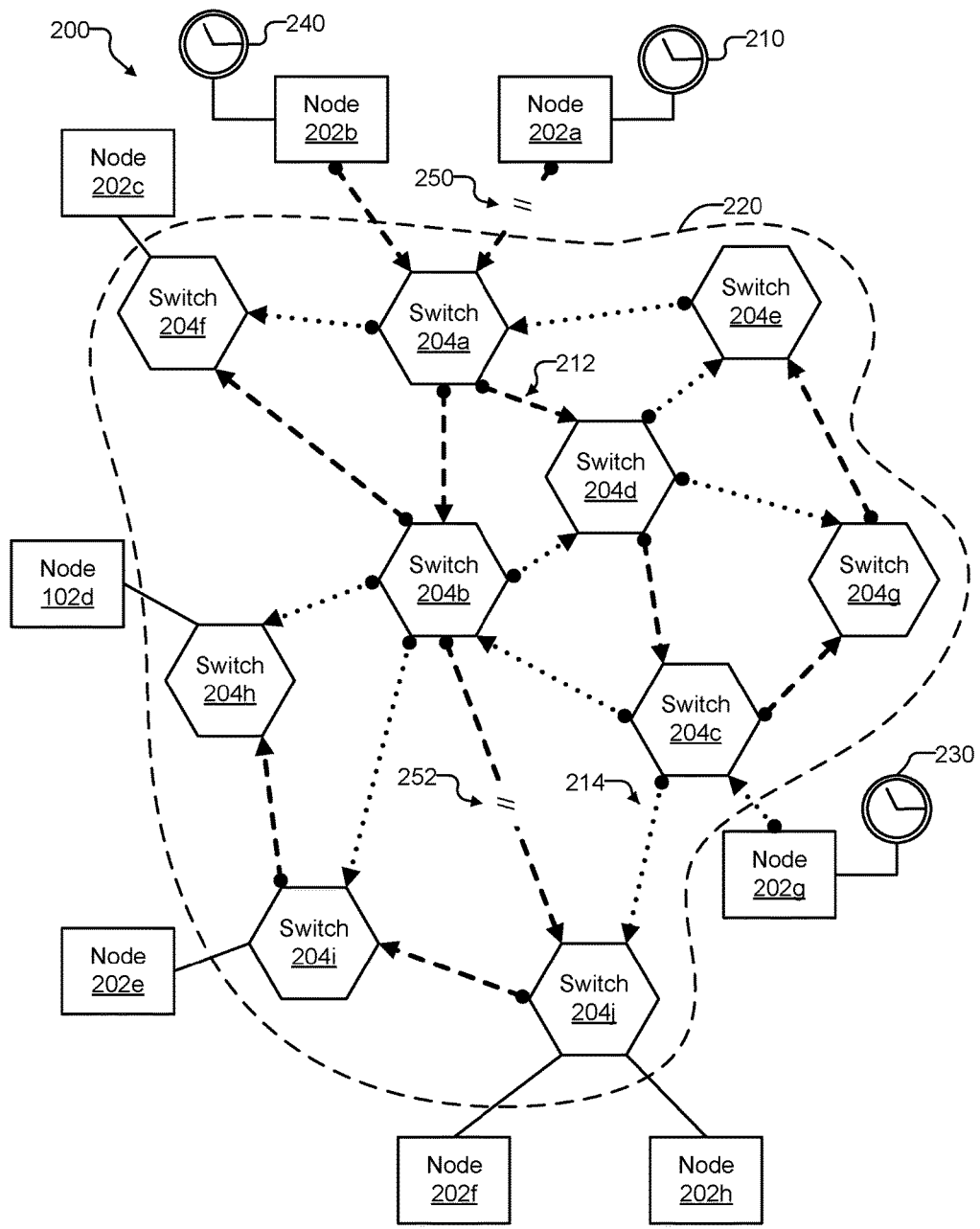
FIG. 2 illustrates another example of a network in which a reliable precision time architecture has be implemented.

FIG. 2 illustrates another example of a network 200 in which a reliable precision time architecture has be implemented. The example network 200 includes a switch fabric 220, through which multiple nodes 202a-202g can communicate with one another. The nodes 202a-202g can be, for example, server computers, data storage arrays, personal computing devices, and/or printers or other peripheral devices, among other things. The nodes 202a-202g can use one or more network protocols to transmit packets across the switch fabric 220. Though only a small number of nodes 202a-202g are illustrated in this example network 200, other example networks can include thousands or hundreds of thousands of nodes.

The switch fabric 220, in this example, includes multiple switches 204a-204j. In other examples, the switch fabric 220 can include a combination network infrastructure devices, including switches, routers, hubs, and/or repeaters, as well as gateway devices that can connect the network 200 to other networks. Though only a few switches 204a-204j are illustrated, a switch fabric can include thousands or hundreds of thousands of switches and/or other network infrastructure devices.

The example network 200 further includes a primary time synchronization tree 212, a backup time synchronization tree 214, and multiple nodes 202a, 202b, 202g that can be used as master time keepers or as backup master time keepers. In this example, the primary time synchronization tree 212 is illustrated using dashed lines, and the backup time synchronization tree is illustrated using dotted lines. Additionally, ports from which time is provided are illustrated using dots, and ports at which time is received are illustrated using arrowheads. The paths in the time synchronization trees 212, 214 use existing network links, and thus the time synchronization trees 212, 214, are illustrated overlaying the network links in the switch fabric 220 that are used for all network traffic.

In primary synchronization tree 212, the node 202a has been designated as the master time keeper, and functions as the root of the primary synchronization tree 212. In some implementations, the node 202a can use its own device local time as the network time. Alternatively or additionally, in some implementations, the node 202a can include or be connected to a clock source 210, such as an atomic clock or a GPS receiver, from which the node 202a can derive the network time. Alternatively or additionally, the node 202a can receive the time from a control plane, which may be local or remote from the node 202a.

Each of the switches 204a-204g further function as vertices in the tree structure. The branches of the tree structure provide paths, over existing network links, from the master time keeper node 202a to each switch 204a-204j in the switch fabric 220. Each path has been determined such that there is a single path from the master time keeper node 202a to each switch 204a-204j, in accordance with the tree structure. For example, the node 202a is connected to the switch 204a. From the switch 204a, the primary synchronization tree 212 includes one path to switch 204b and one path to switch 204d. From switch 204b, there is a path to switch 204f and a path to switch 204j. From switch 204j, there is a path to switch 204i and then switch 204h. Returning to switch 204d, from this switch 204d there is a path to switch 204c, then to switch 204g, and then to switch 204e.

In the example of FIG. 2, the node 202b has been designated as a backup master time keeper for the primary time synchronization tree 212. The node 202b may also have a time source 240, such that the node 202b can provide highly accurate time. The node 202b further shares the switch 204a with the node 202a, and thus can also be the root of the primary time synchronization tree 212. The switch 204a can simultaneously synchronize to the network time provided by both the node 202a and the node 202b. The switch 204a can further be initially configured to use the network time provided by the node 202a.

Having the node 202b as a backup master time keeper guards against a link failure 250 that can disconnect the node 202a from the network. Should such a link failure 250 occur, the switch 204a can change over to using the readily available network time from the node 202b. The switch 204a can also change over when, instead of a link failure 250, the node 202a goes offline. In either case, the switch 204a can detect that time synchronization messages from the node 202a are not forthcoming, and based on that determination, can use the network time from the node 202b instead. In some implementations, the switch 204a may be programmed to use the network time from the node 202b, for example by a network configuration device. For example, the switch 204a may be changed over in advance of the node 202a being taken offline.

The example network 200 also includes a backup time synchronization tree 214. In this example, the backup time synchronization tree 214 uses the node 202g as an alternate or backup master time keeper. The node 202g can include or be connected to time source 230 to obtain highly accurate time. The backup time synchronization tree 214 further includes alternate paths through the network 200, such that a link failure in a path used by the primary time synchronization tree 212 should not affect the alternate paths in the backup time synchronization tree 214. In this example, the alternate master time keeper node 202g is connected to the switch 204c. From the switch 204c, one path leads to the switch 204b and another path leads to the switch 204j. From the switch 204b, paths lead to each of switches 204d, 204h, 204i. From the switch 204d, paths lead to each of switches 204e, 204g. A path goes from the switch 204e to the switch 204a and then to the switch 204f.

The primary time synchronization tree 212, the backup time synchronization tree 214, and any additional backup time synchronization tree are generally actively simultaneously, so that the device in the network 200 can synchronize to the network time provided by the node 202a (or the node 202b) and the node 202g at the same time. The devices can each also independently and autonomously determine to use the network time provided by one or the other time synchronization tree 212, 214 as conditions in the network change.

In various implementations, the network 200 can include a network configuration device that determines the time synchronization trees 212, 214, and configures the switches 204a-204g to support the time synchronization trees 212, 214. The network configuration device can be, for example, a device with a processor or other hardware capable of executing instructions, where the instructions can determine the paths for the primary time synchronization tree 212 and for one or more backup time synchronization trees. In various implementations, the network device can dynamically reconfigure the time synchronization trees 212, 214 when the configuration of the network 200 changes (e.g. devices are added or removed). The network configuration device can be a peripheral device connected to the network. Alternatively or additionally, a node 202a-202g or a switch 204a-204j can be function as the network configuration device.

In various implementations, the network configuration device may have initially configured the devices in the network 200 to use the network time provided by the primary time synchronization tree 212. At some later time, the network configuration device can instruct the devices in the network 200 to use the network time provided by the backup time synchronization tree 214 instead, for example by broadcasting messages into the network. Since the network time provided by the backup time synchronization tree 214 is already available to each device, the change over to the backup time synchronization tree 214 can be independently executed by each device in the network, once the device is instructed to do so.

In various implementations, the devices in the network 200 can additionally autonomously change to using the network time provided by the backup time synchronization tree 214. For example, when a link failure 252 occurs between the switch 204b and the switch 204j, the switch 204j can determine that it can no longer obtain the time from the switch 204b. This determination can be based on the switch 204j being aware that the link has failed, and/or on the switch 204j failing to receive time synchronization messages from the switch 204b in within an expected time interval. Once the switch 204j has determined that it can no longer obtain the network time from the switch 204b, the switch 204j can use the network time provided by the switch 204c instead.

In various implementations, the link failure 252 can further cause the network 200 to disable the primary time synchronization tree 212 by configuring the switches 204a-204j to providing the time using links associated with the primary time synchronization tree 212. As switches 204a-204j determine that the network time is no longer available over links associated with the primary time synchronization tree 212, each switch 204a-204j can instead use the readily available network time provided by the backup time synchronization tree 214.

Figure 3:
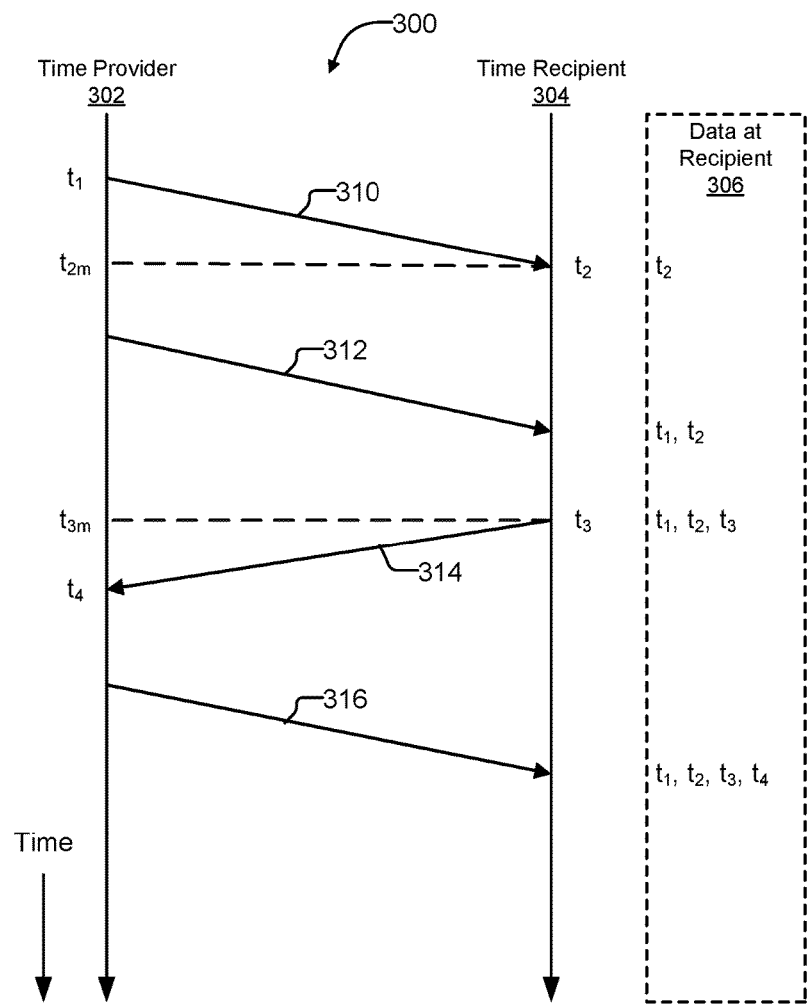
FIG. 3 illustrates an example of an exchange of network messages that can be used by a time provider to synchronize the time at a time recipient.

FIG. 3 illustrates an example of an exchange of network messages 300 that can be used by a time provider 302 to synchronize the time at a time recipient 304. Also illustrated is the data 306 stored by the time recipient 304 in the course of the exchange of messages 300. The particular messages 300, the contents of each message, and the timing of the transmission of each message can be determined by a time synchronization protocol. For example, the particular messages 300 illustrated in this example are based on the Precision Time Protocol (PTP). The Precision Time Protocol is defined in Institute of Electrical and Electronics Engineers (IEEE) 1588.

The exchange of messages 300 involves two devices (the time provider 302 and the time recipient 304 in this example) that share a network link, and thus are neighboring nodes on a network. Sharing a network link, in this context, means that the two devices need only the network link to communicate, and that there is no intervening device between the two devices (e.g., a server connected to, and communicating to a network through, a switch is a neighbor to the switch, but another server connected to the same switch is not a neighbor of the first server, but only a neighbor of the switch).

The time provider 302 is a network device, such as a host device or a network infrastructure device. Host devices include servers, desktop computers, laptop computers, handheld computers, personal digital assistants, and smartphones, among other computing devices. Network interface devices include routers, switches, hubs, repeaters, network controllers, and gateway devices, among others. The time recipient 304 is also a network device. Both the time provider 302 and the time recipient 304 are capable of independently maintaining a time, including a date, hour, minute, seconds, and/or fractions of a second. The time provider 302 is considered the master or source, in that the time being maintained by the time recipient will be synchronized to the time of the time provider 302. The time recipient 304 is thus considered the slave or destination.

The exchange of messages 300 can be used to establish the difference between the time maintained by the time provider 302 and the time maintained by the time recipient 304. This difference will be referred to as the clock offset. The exchange of messages 300 can also be used to determine an approximate network delay over the link between the devices. The network delay is time it may take for messages to travel over the network link between the time provider 302 and the time recipient 304. The delay across the link can be assumed to be symmetric, since each of the messages 300 should have been transmitted over the same network link.

The clock offset and the network delay can be used in various ways to change to the time maintained by the time recipient 304 to be approximately (e.g., within an acceptable margin of difference) the same as the time maintained by the time provider 302. For example, a clock offset value of five indicates that the time at the time recipient 304 is five seconds ahead of the time at the time provider 302. In this example, the time recipient 304 can adjust its time keeping circuit back by five seconds. Additionally, if the network delay is one second, the time recipient 304 can further adjust its time keeping circuit back by one second, to accommodate the network delay.

The example exchange of messages 300 is initiated by the time provider 302. Upon transmitting the first message 310, the time provider 302 records a current time, $t_1$. The current time $t_1$ is based on the time being maintained by the time provider 302. The time $t_1$ is captured as close as possible to the time at which the message 310 is transmitted by the time provider 302. For example, $t_1$ may be captured as the message 310 begins to exit a port of the time provider 302.

When the time recipient 304 receives the first message 310, the time recipient 304 records a current time $t_2$. The time $t_2$ is taken from the time being maintained by the time recipient 304. The time $t_2$ is recorded as close as possible to when the messages 310 is received. For example, the time $t_2$ may be recorded in a port that receives the message 310, as soon as the message 310 has begun to be received. The time recipient 304 stores the time $t_2$.

The time provider 302 next sends a second message 312, which contains the value of $t_1$. Upon receiving the second message 312, the time recipient 304 can compute the difference between $t_2$ and $t_1$. The absolute value of the result of this computation is an approximate difference between the time maintained by the time provider 302 and the time maintained by the time recipient 304, possibly including the network delay. This value will be referred to as the master-to-slave difference.

The time recipient 304 next sends a third message 314, and record the current time, $t_3$, at the time the message 314 is sent. The time $t_3$ is based on the time maintained by the time recipient 304. Upon receiving the message 304, the time provider 302 also records a current time, $t_4$, in this case based on the time being maintained by the time provider 302.

The time provider 302 next sends a fourth message 316, which contains the value of $t_4$. Upon receiving this message 316, the time recipient 304 can compute the difference between $t_3$ and $t_4$. The absolute value of the result of this computation is an approximate difference between the time maintained by the time recipient 304 and the time maintained by the time provider 302, possibly including the network delay. This value will be referred to as the slave-to-master difference.

Using the master-to-slave difference and the slave-to-master difference, the time recipient 304 can now compute both a clock offset and a network delay. The clock offset can be computed by summing the master-to-slave different and the slave-to-master difference, and dividing the result by two. The time recipient 304 can use the clock offset to adjust its time, for example by adding or subtracting the clock offset, as appropriate. The network delay can be computed by subtracting the slave-to-master difference from the master-to-slave difference, and dividing the result by two. The absolute value of this computation is the network delay. The time recipient 304 can use the network delay to adjust timestamps received from the time provider 302. For example, packets received from the time provider device 302 can be assumed to have been sent n seconds in the past, where n is the network delay.

The time provider 302 may initiate the exchange of messages periodically, to ensure that the time at the time recipient 304 remains synchronized with the time at the time provider 302. Small variations in the time keeping circuits of different devices may cause each device's time to gradually change away from the time of the other device. Periodic synchronization can reduce such drift to having a negligible effect.

In some cases, the time provider 302 may be providing the time for more than one time recipient. In these cases, the time provider 302 and each time recipient can exchange a similar sequence of messages 300. The time provider 302 can exchange messages with each time recipient in parallel or serially. Each time recipient will subsequently synchronize their own time to the time of the time provider 302.

As illustrated in FIGS. 1A-1E and FIG. 2, the time recipient 304 as described in FIG. 3 may also be a time provider. In some cases, once the time recipient 304 has synchronized to the time of the time provider 302, the time recipient 304 may then proceed to provide the time to one or more time recipients. In some cases, the time recipient 304 may provide to other time recipients periodically, where the period may not be the same as the period used by the time provider 302 to provide the time to the time recipient 304.

FIG. 3 illustrates one example of an exchange of messages 300 that can be used by two devices to synchronize to the same time. In various implementations, other messages, fewer messages, more messages, and/or messages with different contents can be used.

Figure 4A:
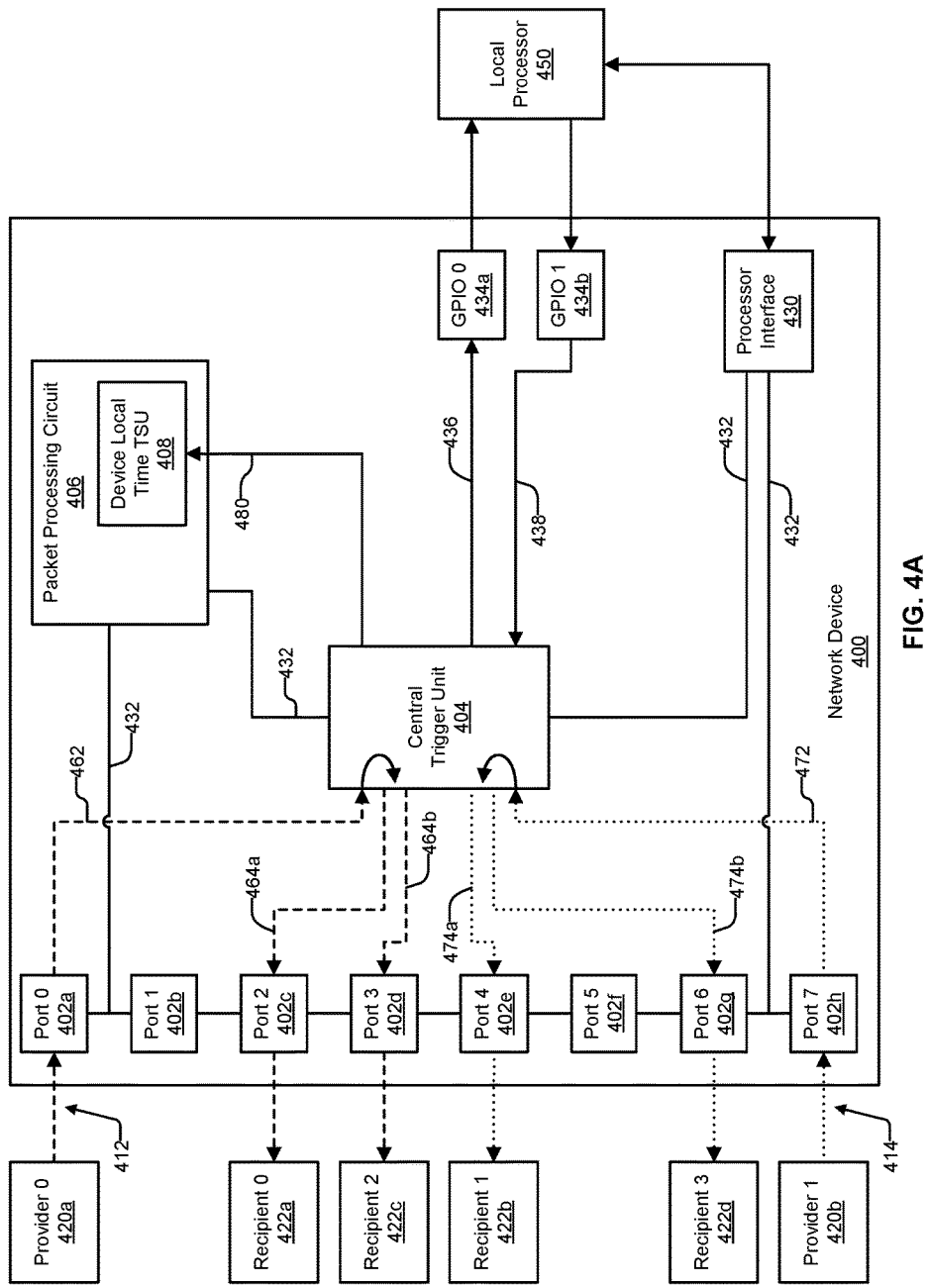
FIG. 4A-4D illustrate an example of a network device that can be used in a reliable precision time architecture.
Figure 4B:
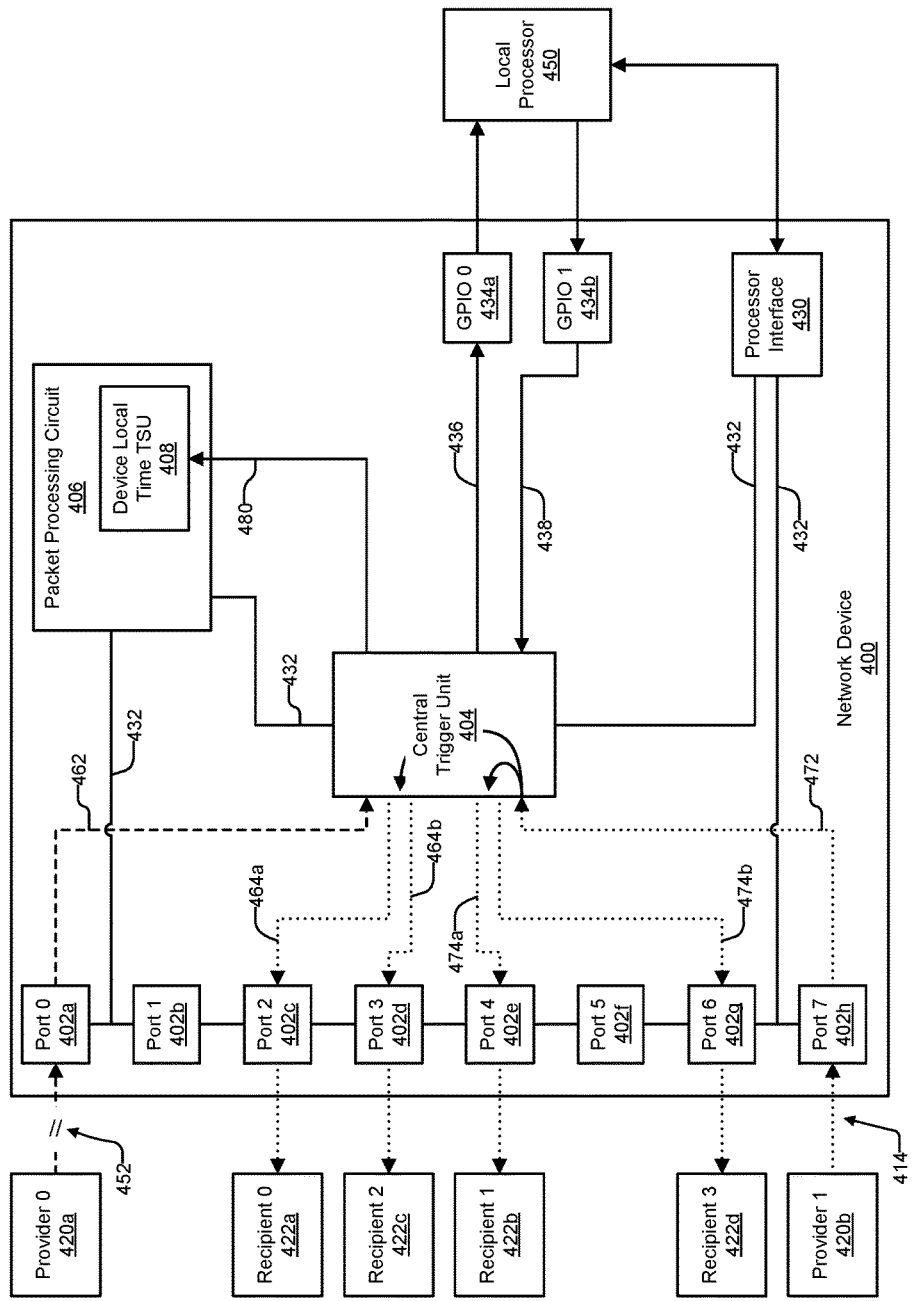
Figure 4C:
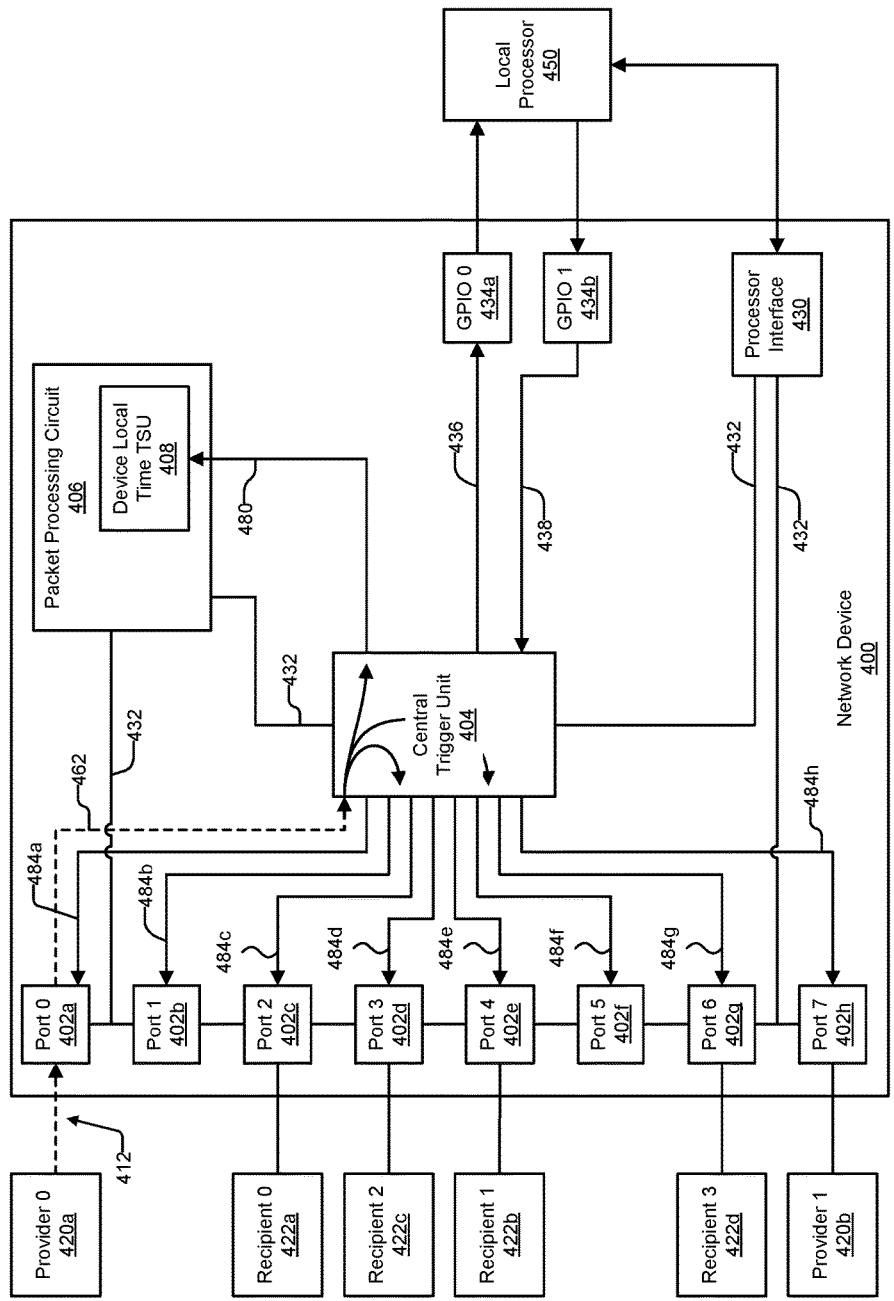
Figure 4D:
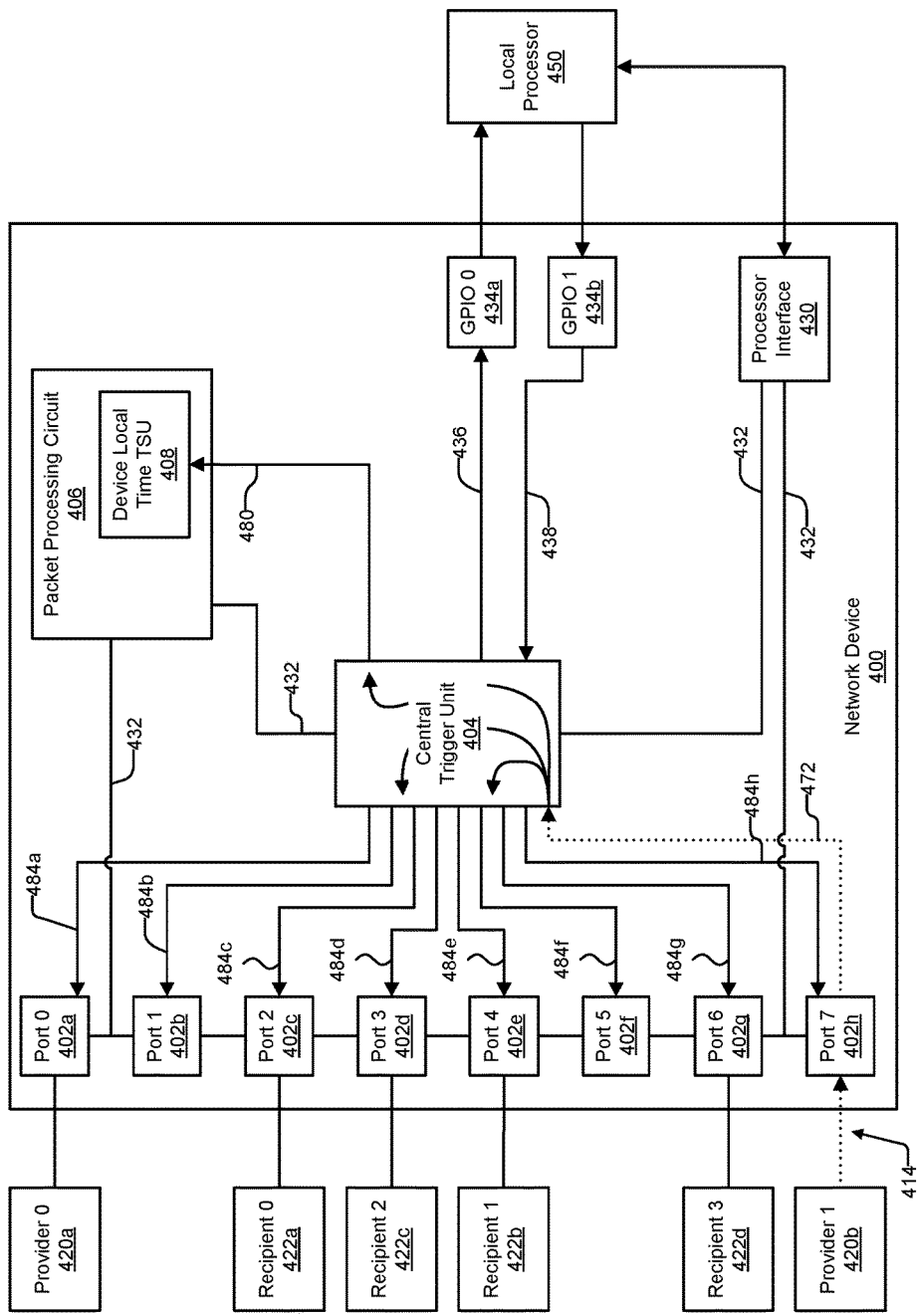

FIG. 4A-4C illustrate an example of a network device 400 that can be used in a reliable precision time architecture. The example network device 400 can be, for example, a host device or a network infrastructure device. In various implementations, the network device 400 can include a number of ports 402a-402h that can be connected to one or more networks. The network device 400 further includes a central trigger unit 404 that can be configured to support multiple time synchronization trees. The network device 400 can also include a packet processing circuit 406 for processing packets. In some implementations, the network device 400 can optionally also include a processor interface 430 and general purpose input/output (GPIO) 434a-434b pins for communicating with a local processor 450. The processor interface 430 can connect to a processor bus 432, which connects to various circuits in the network device 400 that can be accessed by the local processor 450. In various implementations, the network device 400 can include other circuits, memories, processors, signals, pins, and so on, which are not illustrated here.

The ports 402a-402h can include a physical socket or connector for connecting to a network link. The network link can include a physical medium over which data can be transferred using electrical signals, or a wireless connection that uses radio signals to transmit data. The network link can also include a logical connection that describes the relationship between the network device 400 and the device on the other side of the network link. A logical connection can be, for example, an established communication channel between the network device and the network device on the other side of the link.

In various implementations, each port 402a-402h can include a trigger out signal and one or more trigger in signals. The trigger out signal, which is also referred to herein as the output time synchronization signal, is output by each port and is input into the central trigger unit 404. The trigger in signals, which are also referred herein as input time synchronization signals, are input into each port from the central trigger unit 404. FIG. 4A illustrates examples of trigger out 462, 472 signals and trigger in 464a, 464b, 474a, 474b signals that can be used to synchronize the time between ports that are in the same time synchronization tree. Each port 402a-402h can include additional trigger out and trigger in signals, though for the sake of clarity only trigger out and trigger in signals related to the example time synchronization trees 412, 414 are illustrated in the example of FIG. 4A. The operation of the trigger out and trigger in signals is discussed further below.

The central trigger unit 404 can be configured to connect any trigger out signal from any port 402a-402h to the trigger in signal of any port 402a-402h. As discussed further below, the central trigger unit 404 can also provide a trigger out signal as a trigger in signal for circuits within the network device 400, such as the packet processing circuit 406. In various implementations, the central trigger unit 404 can also coordinate time synchronization with the local processor 450, through the GPIO 434a, 434b pins, as discussed below.

In some implementations, the network device 400 can include a processor interface 430 for communicating with a local processor 450 that is outside of the network device 400. Being outside of the network device 400 can mean, for example, that the local processor 450 is on the same board as the network device 400 or is on a different board within the same chassis as the network device 400. The local processor 450, however, is local to the network device 400 in that the local processor 450 and the network device 400 can communicate with one another over a high-speed bus, such as for example a Peripheral Component Interconnect Express (PCIe), an Advanced High-Performance Bus (AHB), or an Advanced Peripheral Bus (APB) bus, among other examples.

In some implementations, the local processor 450 may be inside the network device 400. For example, the network device 400 can be a single integrated circuit with one or more processor cores functioning as the local processor 450. As another example, the network device 400 can be a single board with one or more integrated circuits for the ports 402a-402h, the central trigger unit 404, the packet processing circuit 406, and the local processor 450. As another example, the network device 400 can be a box or chassis that includes the local processor 450 as well as the ports 402a-402h, the central trigger unit 404, and the packet processing circuit 406. In some of these examples, the GPIO 434a, 434b pins may not be needed, and the local processor 450 may be able to connect to the central trigger unit 404 directly.

GPIO pins are generic pins on an integrated circuit whose behavior and direction (input or output) can be configured at run time. In the illustrate example, one GPIO 434a pin has been configured to transmit a trigger in signal 436 to the local processor 450 and another GPIO 434b pin has been configured to receive a trigger out signal 438 from the local processor. As noted above, in some implementations, the GPIO 434a, 4343b pins may not be included in the network device 400. In these implementations, the local processor 450 may be connected directly to the central trigger unit 404.

As noted above, the network device 400 can be configured for use in a reliable precision time architecture. FIG. 4A illustrates one example of the configuration of time synchronization trees using the ports 402a-402h of the example network device 400. In various implementations, any or all of the ports 402a-402h may be capable of individually maintaining a port time. Additionally, in these implementations, each port 402a-402h can function as a time recipient port or a time provider port. In the example of FIG. 4A, the network device 400 has been configured as a vertex in two time synchronization trees. Though illustrated as a vertex in the example of FIG. 4A, in various implementations, the network device 400 can also function as the root, or master time keeper, of a time synchronization tree.

In the example of FIG. 4A, the network device 400 has been configured for two time synchronization trees 412, 414. Either time synchronization tree 412, 414 can be a primary or a backup time synchronization tree. The network device 400 can synchronize to both time synchronization trees 412, 414 simultaneously, and, as discussed further below, can at any time use the network time provided by one or the other time synchronization tree 412, 414. The network device 400 can be configured for additional backup time synchronization trees, not illustrated here. The network device 400 can simultaneously synchronize to these additional backup time synchronization trees as well.

The first time synchronization tree 412 includes a neighboring device, Provider 0 420a, which can provide the time to the network device 400. Provider 0 420a can be a host device or a network infrastructure device. In the first time synchronization tree 412, the network device 400 is a time provider to two neighboring devices, Recipient 0 422a and Recipient 2 422c. Recipient 0 422a and Recipient 2 422c can be host devices and/or network infrastructure devices. The first time synchronization tree 412 is illustrated using dashed lines. The second time synchronization tree 414 includes Provider 1 420b as a time provider to network device 400. In the second time synchronization tree 414, the network device 400 provides the time to Recipient 1 422b and Recipient 3 422d. The second time synchronization tree 414 is illustrated using dotted lines.

In the illustrated example, the network device 400 is connected to Provider 0 420a at Port 0 402a, which can be referred to as a time recipient port. In various implementations, Port 0 402a can maintain a time, referred to herein as the port time. Port 0 402a can maintain the port time using a port time timestamp unit, discussed further below. Using an exchange of messages such as those illustrated in FIG. 3, Port 0 402a of FIG. 4A can synchronize its port time to the time provided by Provider 0 402a. In some implementations, time synchronization at Port 0 402a is controlled by the local processor 450. For example, the local processor 450 can receive the time synchronization messages from Provider 0 420a, and compute the clock offset and network delay. As another example, the local processor 450 may generate the time synchronization messages sent to Provider 0 420a through Port 0 402a. Alternatively, in some implementations, time synchronization can be handled by a dedicated circuit, which may be included in Port 0 402a.

As also illustrated in this example, Recipient 0 422a and Recipient 2 422c are connected to Port 2 402c and Port 3 402d, respectively, of the network device 400. In various implementations, each of Port 2 402c and Port 3 402d can also be individually maintaining a port time. In these implementations, Recipient 0 422a synchronizes its time to the port time of Port 2 402c, and Recipient 2 422c synchronizes its time to the port time of Port 3 402d. Port 2 402c and Port 3 402d can thus be referred to as time provider ports. In some implementations, the local processor 450 can control time synchronization with Recipient 0 422c and Recipient 2 422c, including determining when synchronization should occur and generating time synchronization messages sent to each recipient device. Alternatively, in some implementations, time synchronization at each port 402c, 402d can be controlled by dedicated circuits, which may be located in the ports 402c, 402d.

For Provider 0 420a, Recipient 0 422a, Recipient 2 422c, and the network device 400 to be in the same time domain, the port times of Port 2 402c and Port 3 402d are synchronized to the port time of Port 0 402a. In various implementations, the trigger out 462 and trigger in 464a, 464b signals from and to the ports 402a, 402c, 402d can be used to synchronize these ports 402a, 402c, 402d to a common time.

The trigger out 462 and trigger in 464a, 464b signals may be one or only a few bits wide. Time is typically stored and computed using a large number of bits, such as 32 or 64 bits, with more bits used when a more precise time (e.g., in milliseconds or nanoseconds) is kept. Passing the actual port time maintained by Port 0 402a to Port 2 422c and Port 3

422d may thus be burdensome and prone to introducing inaccuracies. For example, routing a large number bits from each port 402a-402h to and from each other port 402a-402h may create an excessively large number of wires in a chip or traces on a board. Additionally, small differences in the lengths of the wires or traces may cause the time transferred between one set of ports to be slightly different from the time transferred between another set of ports.

Hence, instead of receiving an actual port time from a time provider port, in various implementations, each of the ports 402a-402h individually maintain a port time, and use the trigger out and trigger in signals to synchronize their port times to the port time of the time provider port. For example, Port 0 402a can send an indicator using its trigger out 462 signal, which indicates a time event. The trigger out 462 signal from Port 0 402a can be connected through the central trigger unit 404 to the trigger in 464a, 464b signals of Port 2 402c and Port 3 402d. Upon receiving the indicator, Port 2 402c and Port 3 402d can adjust their respective port times, where the adjustment makes the port times approximately (that is, within an acceptable margin of difference) the same as the port time of Port 0 402a.

In various implementations, time events signaled using a trigger out signal can indicate various different things. For example, Port 0 402a can toggle its trigger out 462 signal each time the port time maintained by Port 0 402a crosses a 100 ns (or 1000 ns, or some other value) boundary; for example, a toggle would occur at 100 ns, 200 ns, 300 ns, 400 ns, etc. In this example, when Port 2 402c receives, the toggle on its trigger in 464a signal, Port 2 402c can adjust the port time that Port 2 402c maintains according. For example, if the port time at Port 2 402c is 198 ns when Port 2 402c receives a toggle on its trigger in 464a signal, Port 2 402c can cause its port time to jump to 200 ns.

In various implementations, the meaning of the time events can be configurable. For example, the local processor 450 can configure Port 2 402c and Port 3 402d to treat each toggle of their trigger in 464a, 464b signals as indicating that ten (or some other number) of nanoseconds have passed. In various implementations, the trigger out and trigger in signals may be two, three, or more bits wide, and carry an encoded time event indicator. For example, one two-bit encoding may mean that one nanosecond has passed, while another two-bit encoding may mean that ten nanoseconds have passed. The meaning of the two, three, or more bits may be hardcoded into each port 402a-402h, or may be configurable.

Provider 1 420b, Recipient 1 422b, and Recipient 3 422d can be connected together into the second time synchronization tree 414 in a similar fashion. In the illustrated example, Provider 1 420b is connected to Port 7 402h of the network device, and Recipient 1 422b and Recipient 3 422d are connected to Port 4 402e and Port 6 402g, respectively The trigger out 472 signal from Port 7 402h can be connected through the central trigger unit 404 to the trigger in 474a, 474b signals of Port 4 402e and Port 6 402g. Using its trigger out 472 signal, Port 7 402h can thus synchronize the port times at Port 4 402e and Port 6 402g to the port time at Port 7 402h.

Generally, the time synchronization trees 412, 424 are actively and simultaneously synchronizing to the network times being provided by Provider 0 420a and Provider 1 420b. The port times at Port 0 402a, Port 2 402c, and Port 3 402d are thus each synchronized to the network time provided by Provider 0 420a. Similarly, the port time at Port 7 402h, Port 4 402e, and Port 6 402g are at the same time synchronized to the network time provided by Provider 1 420b. In some cases, the network times provided by Provider 0 420 and Provider 1 420b is the synchronized to the same network time. For example, each of the time synchronization trees 412, 414 may have the same master time keeper. In other cases, each of the time synchronization trees 412, 414 may have a different master time keeper, and so the network times provided by Provider 0 420a and Provider 1 420b may or may not be synchronized.

The network device 400 is also simultaneously providing the time to Recipient 0 422a, Recipient 2 422c, Recipient 1 422b, and Recipient 3 422d. Because the network device has simultaneous access to the network time provided by Provider 0 420a and Provider 1 420a, when a link failure occurs, the network device 400 can continue to provide the network time to the recipient devices without interruption.

FIG. 4B illustrates an example where a link failure 452 has occurred at Port 0 402a, disconnecting the network device 400 from Provider 0 420a. In various implementations, Port 0 402a may convey the failure of the link to the network device 400 and/or to the local processor 450. Alternatively or additionally, the local processor 450 may determine that Port 0 402a can no longer synchronize with Provider 0 420a because, for example, time synchronization messages from Provider 0 420a did not arrive when expected.

In these and other examples, the network device 400 can be reconfigured so that Recipient 0 422a and Recipient 2 422c are provided with the network time from Provider 1 420b instead of the network time from Provider 0 420a. For example, in various implementations, the local processor 450 can reconfigure the central trigger unit 404 so that the trigger out 472 signal from Port 7 402h is also connected to the trigger in 464a, 464b signals of Port 2 402c and Port 3 402d. Once Port 2 402c and Port 3 402d start receiving time synchronization signals from Port 7 402h, Port 2 402c and Port 3 402d may need adjust their respective port times to be similar to the port time of Port 7 402h. Similarly, Recipient 0 422a and Recipient 2 422c may also adjust to synchronize to the network time being provided by Provider 1 420b.

In various implementations, the network device 400 may reconfigure to using Provider 1 420b and not using Provider 0 420a for reasons other than a failure 452 of the link with Provider 0 420a. For example, Provider 0 420a may have stopped sending time synchronization messages for reasons unknown to the network device 400. As another example, the network device 400 and/or the local processor 450 may be configured to expect time synchronization messages from Provider 0 420a at pre-determined intervals. In this example, time synchronization messages from Provider 0 420 may be late, either occasionally or consistently. In either case, the network device 400 and/or local processor 450 may determine that Provider 0 420a is not reliably able to provide the network time, and thus may configure the network device 400 to not use Provider 0 420a.

Returning to examples where the link between Port 0 402a and Provider 0 420a is enabled, in various implementations, the network device 400 can use a port time maintained by a particular port for internal and external time keeping. For example, the port time at each of the ports 402b-402h can be synchronized to the port time at Port 0 402a. Each of the ports 402a-402h can then use their port times to, for example, insert timestamps into packets being transmitted by the network device 400 or to compare against timestamps in packets that are received by the network.

Alternatively, in some implementations, the network device 400 may maintain a device local time, which the network device 400 can use for internal and external time keeping. The network device 400 may, for example, use the device local time to timestamp file creation or modification, to timestamp events entered in log files, to timestamp packets sent to the network, or to compare against timestamps in packets received from the network, among other things.

In these implementations, the network device 400 can synchronize its device local time to a network time provided by any of the available time synchronization trees 412, 414. For example, the network device's 400 device local time can be synchronized to the port time of Port 0 402*a*. In various implementations, the port time of Port 2 402*c* or Port 3 402*d* can also be used.

Similar to the port time, the device local time may be maintained and computed using a large number of bits. The network device 400 may further use the device local time in many places across the device, including, for example, in each port 402*a*-402*h* and in the packet processing circuit 406. The network device 400 could have one time keeping circuit that maintains the device local time. But routing the time from the one time keeping circuit to each circuit in the network device 400 that uses the time may be difficult, burdensome, and/or inefficient.

Thus, in various implementations, the network device 400 may maintain a device local time in each circuit that uses the device local time. For example, the packet processing circuit 406 can include a device local timestamp unit 408 for maintaining the device local time. As a further example, each port 402*a*-402*h* can include a device local timestamp unit (not shown here) for maintaining the device local time. In these implementations, the individual device local times can be synchronized using trigger out and trigger in signals. FIG. 4B illustrates an example of trigger out 462 signals and trigger in 484*a*-484*h* signals that can be used to synchronize the device local time at each port 402*a*-402*h* to the common, network time. Each port 402*a*-402*h* can have additional trigger out and trigger in signals, and the network device 400 may include additional trigger out signals to other circuits, but for the sake of clarity these signal and circuits are not illustrated here.

In the example illustrated in FIG. 4B, Provider 0 420*a* has been selected to provide the network time to the network device 400. In other examples, Provider 1 420*b* can be selected instead. As discussed above, in various implementations, Port 0 402*a* can synchronize its port time to the time being provided by Provider 0 420*a*.

The port time maintained by Port 0 402*a* can further be used to synchronize the device local time to the network time. As discussed above, Port 0 402*a* can indicate time events using a trigger out 462 signal. In most implementations, this trigger out 462 signal can be the same trigger out 462 signal used to synchronize the ports 402*c*, 402*d* in the first time synchronization 412 tree to the network time. The central trigger unit 404 can be configured to connect the trigger out 462 signal to trigger in 484*a*-484*h* signals to each of the ports 402*a*-402*h*. These trigger in 484*a*-484*h* signals can be, in most implementations, different from the trigger in 464*a*, 464*b*, 474*a*, 474*b* used to synchronize the port time. Upon receiving a time event on the trigger in 484*a*-484*h* signals, each port 402*a*-402*h* can adjust their respective device local times to be approximately the same as the port time at Port 0 402*a*. For example, the time event can indicate a fixed time interval (e.g., a one nanosecond interval, or an interval of some other length), a configurable time interval, and/or an encoded event.

In various implementations, the network device 400 can include pipeline blocks for delaying the trigger in and trigger out signals, so that propagation delay from each one trigger out output to trigger in input is the same. Long signal traces in the network device 400 can cause some delay in a trigger out signal from, for example, Port 0 402*a* reaching the central trigger unit 404. Signal traces can further be different lengths, resulting in different propagation delays. Thus, in various implementations, the network device 400 can include pipeline blocks that balance the propagation delays in each of the trigger out and trigger in signals. The pipeline blocks can be located, for example, at each trigger out output and trigger in input of the ports 402*a*-402*h*. Alternatively or additionally, pipeline blocks can be located at each input and output of the central trigger unit. In various implementations, to achieve balanced delay, each pipeline block can have the same number of pipeline stages.

In various implementations, the network device 400 can also use the trigger out 462 signal from Port 0 402*a* to synchronize device local times being maintained in circuits other than a port, such as the packet processing circuit 406. In the illustrated example, the packet processing circuit 406 can include a device local timestamp unit 408 for maintaining the device local time. In this example, the packet processor circuit 406 is not configured to take part in synchronizing the network device 400 to the network time. Hence, neither the packet processing circuit 406 nor its device local timestamp unit 408 include a trigger out signal.

The packet processing circuit 406 maybe process packets received by the network device 400 to determine each packets' next destination. Processing a packet can include, for example, identifying a destination address and a route through the network to the destination address, and/or determining which of the ports 402*a*-402*h* can get the packet to the device at the destination address.

The packet processing circuit 406 can use the device local time for various purposes. For example, the packet processing circuit 406 may generate statistics for packets that pass through the network device 400. These statistics can include, for example, counts of various types of packets received, counts of the sizes of packets received, counts of the number of times packets were received from certain addresses, and/or counts of the number of times packets were sent to certain addresses, among other things. The statistics may be periodically transmitted by the packet processing circuit 406 to the local processor 450 and/or to a monitoring device in the network, either of which may analyze the statistics. Alternatively or additionally, the statistics may be periodically read by the local processor 450 to be analyzed. When the statistics are collected from the packet processing circuit 406, the packet processing circuit 406 may attach a timestamp to the set of statistics. The statistics can thus be connected to the timeframe during which they were collected.

As another example, the device local time can also be used to measure the latency of packets passing through the network device. For example, when a packet is received, the port at which the packet is received (e.g., Port 1 402*b*) can attach a timestamp to the packet. The port can use the device local time maintained by the port to generate the timestamp. Once the packet has been processed by the packet processing circuit 406, the packet may be delivered to another port (e.g., Port 5 402*f*). This port can also generate a timestamp, using its own device local time, as the packet is transmitted. The receipt timestamp (e.g., generated by Port 1 402*b*) and the transmit timestamp (e.g., generated by Port 5 402*f*) can then be used to compute the amount of time the packet spent inside the network device 400. In some implementations, the outbound port (e.g., Port 5 402*f*) can provide both timestamps by, for example, reading the timestamp from the packet before transmitting the packet. In some implementations, the local processor 450 compute the packet's latency. In various implementations, the local processor 450 can maintain an average latency using timestamps from many packets. The average latency can be provided to network monitoring tools and/or network administrators for analysis.

In various implementations, the network device 400 can also synchronize time with the local processor 450. Synchronizing time with the local processor 450 can include synchronizing the local processor 450 to the network time. Synchronizing time with the local processor 450 can also include synchronizing the network device 400 to a time provided by the local processor 450.

In various implementations, the local processor 450 may be using the network time for its own purposes, such as for example to launch processes that are to run at a certain time of the day or day of the week, to track the amount of time certain processes took to run or the amount of time certain processes have been running, and/or to track the performance of the local processor 450, among other things. The local processor 450 can thus synchronize its own clock with the network time, so that the activities of the local processor 450 are synchronized with the activities of the rest of the network.

To synchronize the local processor's time to the network time, the central trigger unit 404 can be configured to connect the trigger out 462 signal from Port 0 402*a* to a trigger in 436 signal to the local processor 450. In some implementations, the trigger in 436 signal is provided to the local processor 450 using a GPIO pin, labeled GPIO 0 434*a* in the illustrated example. When Port 0 402*a* signals a time event, the local processor 450 can also receive the time event, and adjust its clock based on the time event.

In various implementations, the local processor 450 can be a time provider, and can cause the network device 400 to synchronize to a time being maintained by the local processor 450. In these implementations, the local processor 450 can use a trigger out 438 signal to indicate time events. In some implementations, the trigger out 438 signal is received from the local processor 450 using a GPIO pin, labeled GPIO 1 434*b* in this example. In these implementations, the central trigger unit 404 can be configured to connect the trigger out 438 signal from the local processor 450 to the trigger in 484*a*-484*h* signals of each of the ports 402*a*-402*h* and to the trigger in 480 of the device local time timestamp unit 408. The local processor 450 may be the time provider for the network device 400 when, for example, the local processor 450 is a master time keeper. As another example, the local processor 450 may be the time provider when the network device 400 first powers on or after the network device 400 is reset. In this example, the local processor 450 may configure the time in each of the ports 402*a*-402*h* and in the device local time timestamp unit 408 (as described below), and then send time events to achieve a uniform time across the network device 400. The network device 400 can subsequently synchronize this time to the network time.

In various implementations, the local processor 450 can set the time for the network device 400. For example, when the network device 400 first powers on, the various port times and device local times across the device may be set to zero or a random value. In such an example, the local processor 450 may obtain the current time, and then write the current time to each circuit in the network device 400 that is keeping the time. The local processor 450 may be able to obtain a current time, for example, from a time keeping circuit that is run by a battery, and thus is able to maintain the time when the network device 400 is powered off. Alternatively or additionally, the local processor 450 may be able to obtain the current time from the network, for example by issuing a request, using one or more packets sent to the network, that a device in the network provide the current time. Alternatively or additionally, the current time may be set by a system administrator, or a system or device that connects to the local processor 450 for purposes of setting the current time.

Having obtained the current time, the local processor 450 may then configure the network device 400 with the current time. The local processor 450 can, through the processor interface 430, send write transactions onto the processor bus 432 to each port 402*a*-402*h* and to the packet processing circuit 406. The write transactions can to write the current time into the time keeping circuits in each of the ports 402*a*-402 and in the device local time timestamp unit 408 in the packet processing circuit 406. In the ports 402*a*-402*h*, write transactions can write the current time into circuits (such as timestamp units) that are maintaining the port time and the device local time.

The current time, however, may not be quite the same as the network time, even when the current time was obtained from the network. For example, writing the current time to each time keeping circuit in the network device 400 may have taken a number of clock cycles, and, hence, the time value may be slightly old by the time the value is written to a register. The network device 400, however, can start synchronizing to the network time as soon as Provider 0 420*a* (in the example of FIG. 4B) initiates a time synchronization exchange of messages. In various implementations, when the network device 400 powers on, Provider 0 420*a* may be able to identify that the network link between Provider 0 420*a* and the network device 400 is new, and thus may immediately being time synchronization. Alternatively, in some implementations, the network device 400 may be able to send a message to Provider 0 420*a*, requesting Provider 0 420*a* to initiate time synchronization.

Generally, time synchronization, particularly across a network, occurs incrementally. For example, time synchronization messages from Provider 0 420*a* may indicate to Port 0 402*a* that the port time being maintained by Port 0 402*a* is behind or ahead, and thus should be sped up or slowed down. In various implementations, the time synchronization messages exchanged between Provider 0 420*a* and Port 0 402*a* indicate the degree and direction of adjustment. In this example, Provider 0 420*a* may itself, however, be adjusting its own network time to the time being provided to Provider 0 420*a*. Thus, some time may be needed for the port times and device local times maintained by the network device 400 to stabilize and converge on the accepted network time. Once the network device 400 has converged on the network time, the network device 400 may periodically resynchronize to Provider 0 420*a* (and Provider 1 420*b*) to accommodate for drift between the clocks in each of these devices.

As discussed above, a failure of a network link or a node in the network can cause the network device to change over from using the network time from one time synchronization tree (e.g., the first time synchronization tree 412) to using the network time from another time synchronization tree (e.g., the second time synchronization tree 414). In some cases, failure may have occurred at a link or node that is not adjacent to the example network device 400. In other cases, the failure may have occurred in a link that is connected to a port 402*a*-402*h* of the network device 400, or the failure may have involved a neighbor device (e.g., Provider 0 420*a*, Recipient 0 422*a*, or Recipient 2 422*c*, or some other neighbor device) of the network device 400, making the neighbor device no longer available. In some implementations, the network device 400 may use the same procedure in each of these cases to change over to the second time synchronization tree 414. In some implementations, the network device 400 may use different procedures when the failure is not in an adjacent link or node than when the failure is adjacent to the network device 400.

When a failure in the network is not in a link connect to a port 402*a*-402*h* of the network device 400, and is not in a neighboring device, the network device 400 may learn of the need to change over to the second time synchronization tree 414 in various ways. For example, the local processor 450 may be informed of the change over from control packets received from the network. In this example, the local processor 450 may subsequently configure the network device 400 to no longer use the device local time to the port time of Port 0 402*a*. Specifically, the local processor 450 may configure the central trigger unit 404 to disconnect the trigger out 462 from Port 0 402*a* from each of the trigger in 484*a*-484*h* signals that the ports 402*a*-402*h* use to synchronize their individual device local times. The local processor 450 can also configure the central trigger unit 404 to disconnect the trigger out 462 from Port 0 402*a* from the trigger in 480 signal of the device local time timestamp unit 408 of the packet processing circuit 406. When the local processor 450 is also being synchronized to the network time, the trigger in 436 signal to the local processor 450 can also be disconnected.

The local processor 450 can further configure the central trigger unit 404 to connect the trigger out from Port 7 402*h* to each of these trigger in 484*a*-484*h*, 480, 436 signals. FIG. 4C illustrates an example of the network device 400 after the network device 400 has been changed over to using the network time provided by the second time synchronization tree 414. Provider 1 420*b* is now the source of the network time, and the port time at Port 7 402*h* can be synchronized to the time being provided by Provider 1 420*b*. The device local time maintained by each port 402*a*-402*h* and maintained by the device local time timestamp unit 408 can also now be synchronized to the port time at Port 7 402*h* instead of the port time at Port 0 402*a*. When the local processor 450 is also being synchronized to the network time, the trigger in 436 signal to the local processor 450 can also be connected to the trigger out 472 of Port 7 402*h*.

In various implementations, the trigger in 464*a*, 464*b* signals used by Port 2 402*c* and Port 3 402*d* to synchronize the port times of by Port 2 402*c* and Port 3 402*d* to the port time of Port 0 402*a* can remain connected, for example in case the network changes back to the first time synchronization tree 412.

In various implementations, the network device 400 can alternatively or additionally learn of a failure elsewhere in the network when Provider 0 420*a* stops providing the time. Specifically, Provider 0 420*a* may stop sending time synchronization messages to Port 0 402*a*. Provider 0 420*a* may itself have stopped receiving time synchronization messages. The local processor 450 (or hardware dedicated to synchronizing the time), may notice that Port 0 402*a* is no longer receiving time synchronization messages. For example, the processor 450 (or other hardware) may expect time synchronization messages at pre-determined intervals (e.g., every 1, 5, 10, 100 milliseconds or some other number of milliseconds). When the interval expires and no time synchronization messages are received at Port 0 402*a*, the local processor 450 may determine that the first time synchronization tree 412 is no longer in use by the network. In various implementations, the local processor 450 may confirm that the first time synchronization tree 412 is no longer in use, for example by requesting confirmation from Provider 0 420*a*.

Once the local processor 450 (or other hardware) has determined that, for one reason or another, the network device 400 should no longer use the network time provided by the first time synchronization tree 412, the local processor 450 can initiate a change over to the network time from second time synchronization tree 414 using the procedure discussed above, including disconnecting the trigger out 462 from Port 0 402*a* from any trigger in signal used to synchronize a device local time, and connecting the trigger out 472 from Port 7 402*h* to these same trigger in signals.

When the link or node failure is adjacent to the network device 400, the network device 400 may have mechanisms unrelated to time synchronization that can detect the failure. For example, the network device 400 may be have packet streams being exchanged with, for example, Recipient 0 422*a*, or else may be engaged in regular exchanges of messages with Recipient 0 422*a* that confirm that Recipient 0 422*a* and the network device 400 are running and functioning properly. When any of these communications cease, the network device 400 can determine that the link to Recipient 0 422*a* has failed, or that Recipient 0 422*a* has failed or has otherwise gone offline.

Failure of an exchange of time synchronization messages can also indicate a failure in an adjacent link or device. For example, failure to receive a response to a time synchronization message from Recipient 0 422*a* can indicate that Recipient 0 422*a* is no longer reachable. As another example, failure to receive time synchronization messages from Provider 0 420*a* can indicate that Provider 0 420*a* is no longer reachable.

In some implementations, when the network device 400 has determined that, due to an adjacent failure, the first time synchronization tree 412 can no longer be used, the network device 400 may do nothing until the network device 400 has received a message telling the network device 400 to change over to another time synchronization tree. For example, the network device 400 may be configured with multiple time synchronization trees, and may need to be informed which time synchronization tree is now in use. Alternatively, in some implementations, the network device 400, once the device has determined that the first time synchronization tree 412 can no longer be used, may immediately change over to the second time synchronization tree 414. In these implementations, the network device 400 may have been, for example, configured to use the second time synchronization tree 414 automatically in the event that the first time synchronization tree 412 can no longer be used. Alternatively, the second time synchronization tree 414 may be the only backup time synchronization tree.

Once the network device 400 has determined that, due to a failure in an adjacent link or node, the network device 400 needs change over to the second time synchronization tree 414, the network device 400 can do so using procedures such as are discussed above. That is, the local processor 450, or hardware dedicated to time synchronization, can reconfigure the central trigger unit 404 to disconnect the trigger out 462 signal from Port 0 402*a* from any trigger in signal that is being used to synchronize a device local time, and to connect the trigger out 472 signal from Port 7 402*h* to the same trigger in signals.

Figure 5:
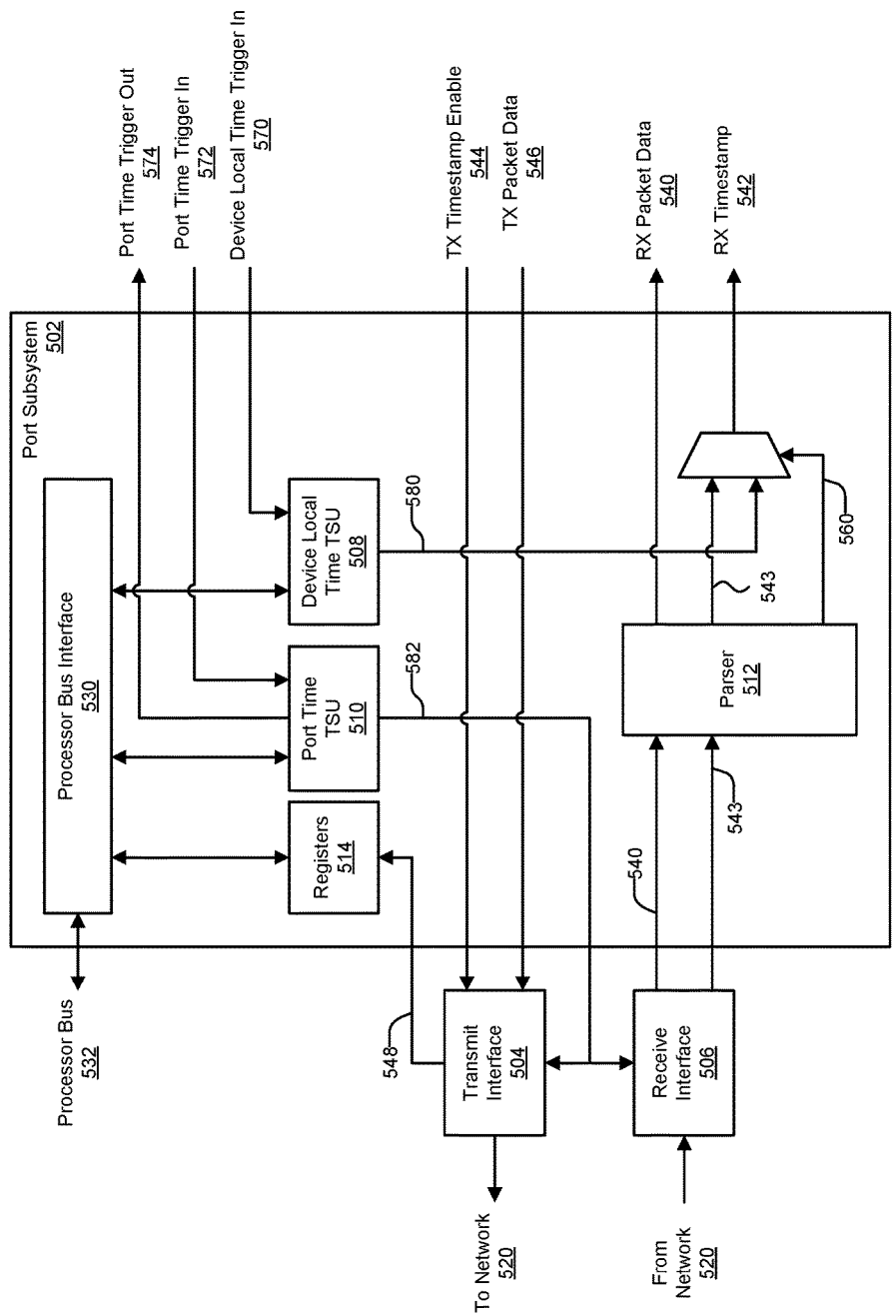
FIG. 5 illustrates an example of a port subsystem that includes circuits for supporting a reliable precision time architecture.

FIG. 5 illustrates an example of a port subsystem 502 that includes circuits for supporting a reliable precision time architecture. The example port subsystem 502 can be used by a network device to implement one or more ports. The port subsystem 502 includes a transmit interface 504 for transmitting packets to a network 520 and a receive interface 506 for receiving packets from the network 520. The example port subsystem 502 can further include a port time timestamp unit (TSU) 510, which the port subsystem 502 can use to synchronize to a network time. The port subsystem 502 can further include a device local time timestamp unit (TSU) 508 that locally maintains the device local time. The port subsystem 502 can further include a parser 512 for reading the contents of packets received from the network 520, and a processor bus interface 530 for communicating with a processor bus 532. In various implementations, the port subsystem 502 can include other circuits, which are not illustrated here.

The port subsystem 502 can receive transmit (TX) packet data 546 from a network device, for transmission onto the network. In some cases, the transmit packet data 546 for a particular packet may include a transmit (TX) timestamp enable 544 indicator, which indicates to the port subsystem 502 that a timestamp should be added to the particular packet. The port subsystem 502 can further output received (RX) packet data 540 to the network device. In some cases, the received packet data 540 can be accompanied by a received (RX) timestamp 542.

The transmit interface 504 can receive the transmit (TX) packet data 546 from the port subsystem 502. The transmit interface 504 can include hardware, and in some cases software, for managing physical communication channels with other devices in the network 520, and/or for processing the transmit packet data 546 into electrical signals that can be transferred across the network 520. For example, the transmit interface 504 can include a Media Access Control (MAC) circuit for implementing the MAC layer of a network protocol stack, and physical components for implementing the physical layer of the network protocol stack.

In some implementations, the transmit interface 504 may output the timestamp inserted into a transmitted packet as a transmit timestamp 548. The transmit timestamp 548 may be provided to registers 514, where one or more transmit timestamps 548 can be at least temporarily stored. For example, the registers 514 can include a first-in, first out queue that can store two, three, four or more transmit timestamps 548 at a time. In various implementations, the stored transmit timestamps 548 can be read, for example, by a local processor that can use the processor bus 532 and processor bus interface 530 to reach the registers 514. The local processor can, for example, use the transmit timestamps 548 to compute clock offsets and network delays.

The receive interface 506 can receive packets from the network 520 and provide the receive packet data 540 to the port subsystem 502. The receive interface 506 can include hardware, and in some cases software, for managing physical communication channels with other devices in the network 520, and/or for processing electrical signals coming from the network 520 into the receive packet data 540. For example, the receive interface 506 can include a Media Access Control (MAC) circuit for implementing the MAC layer of a network protocol stack, and physical components for implementing the physical layer of the network protocol stack.

In various implementations, the receive interface 506 can be configured to capture timestamps 543 for all packets or for designated packets received from the network 520, where the captured timestamp is provided by the port time 582. In various implementations, the receive interface 506 may be configured to capture the timestamp as near as possible to receipt of the packet from the network 520. The timestamp, for example, may later be used to compute a clock offset and network delay.

In various implementations, the receive interface 506 can provide a captured timestamp 543 with receive packet data 540 for a particular packet to the parser 512. The parser 512 can read some or all of the packet and identify, for example, a type or class of the packet, source or destination address of the packet, and/or a network identifier for the packet, among other things. For packets of a particular type or class, or having a particular address, or having some other identifying characteristic, or for all packets, in some implementations the parser 512 can be configured to provide either the captured timestamp 543 or the device local time 580 as a received timestamp 542 with the received packet data 540. For example, the parser 512 can identify time synchronization packets, and for these packets set a selector signal 560 to select the captured timestamp 543. In this example, for all other packets the parser 512 can set the selector signal 560 to select the device local time 580.

In the above example, received packets other than time synchronization packets can be time stamped with the value of the device local time 580 at the time when the packets were received. These receive timestamps can later be used, for example, to determine the latency of the packet across a network device. For example, a port that is to transmit the packet also will have a device local time timestamp unit 508 that is synchronized as close as possible to the device local timestamp unit 508 of the receiving port using the device local time trigger in, as discussed above. The device local timestamp units 508, though located in different ports, can thus be used to determine the difference between the time a packet was received at a port and the time when the packet was transmitted by a port.

As noted above, the port time timestamp unit 510 maintains the port time 582 for the port subsystem 502. In some cases the port time 582 can be synchronized to a network time being provided by a neighboring network device. When the port time 582 is synchronized to an external time provider, a port implemented using the port subsystem 502 can be referred to as a time recipient port. To synchronize the port time 582 to the time provided by a neighboring network device, the port time timestamp unit 510 can receive time adjustments, such as clock offsets, over the processor bus 532. Alternatively or additionally, the port time timestamp unit 510 can receive time events over a port time trigger in 572 signal. The port time trigger in 572 signal may be driven, for example, by the trigger out signal from a local processor.

The port time timestamp unit 510 can further be the time provider for port time timestamp units and/or device local timestamp units in other ports or circuits in the network device. The port time timestamp units and/or device local timestamp units can be synchronized to the port time 582 maintained by the port time timestamp unit 510 of the port subsystem 502. To synchronize other timestamp units, the port time timestamp unit 510 can send time events over a port time trigger out 574 signal. Any timestamp units connected to the port time trigger out 574 signal can use the time events to adjust the time maintained by each of these timestamp units.

In some cases, the port time timestamp unit 510 may be synchronized to the port time of another port within the network device. In these cases, the port subsystem 502 may be providing the network time to other network devices. In these cases, a port implementing the port subsystem 502 can be referred to as a time provider port. When the port time timestamp unit 510 is being synchronized to the port time of another port, the port time timestamp unit 510 can receive time events over a port time trigger in 572 signal. The port time trigger in 527 signal can be connected to the trigger out signal from the other port.

As noted above, the device local time timestamp unit 508 can maintain a local version of the device local time 580. The device local time 580 can be synchronized to the port time maintained by the port time timestamp unit of a time provider port. In some cases, this port time timestamp unit may be in the same port subsystem 502 as the device local time timestamp unit 508. To synchronize the device local time timestamp unit 508 to a port time, the device local time timestamp unit 508 can receive time events over a device local time trigger in 570 signal. In some implementations, the device local time timestamp unit 508 may also receive time adjustments, such as clock offsets, over the processor bus 532.

Separately maintaining the port time 582 and the device local time 580 in each port provides a mechanism for maintaining multiple time synchronization trees without disrupting the maintaining of the device local time 580. For example, the port time timestamp unit 510 may be synchronizing to the network time from a backup time synchronization tree. At the same time, the device local time timestamp unit 508 can independently maintain and provide the device local time 508, which is synchronized (using the device local time trigger in 570) to the accepted network time being provided by a primary time synchronization tree. In this example, another port may be synchronizing to, and providing trigger output signals for, the network time from the primary time synchronization tree. When a link failure occurs, as discussed above, the source for device local time trigger in 570 can be quickly changed by reconfiguring the central trigger unit. The device local timestamp unit 580 can then adjust the device local time 580 to a different time source, while still being able to provide the device local time 580 for incoming packets.

In various implementations, the port time 582 and the device local time 580 can be read from the port time timestamp unit 510 and the device local time timestamp unit 508, respectively, over the processor bus 532. In various implementations, other values, such as offsets and other time adjustments, can also be read from or written to the port time timestamp unit 510 and the device local time timestamp unit 508.

Figure 6:
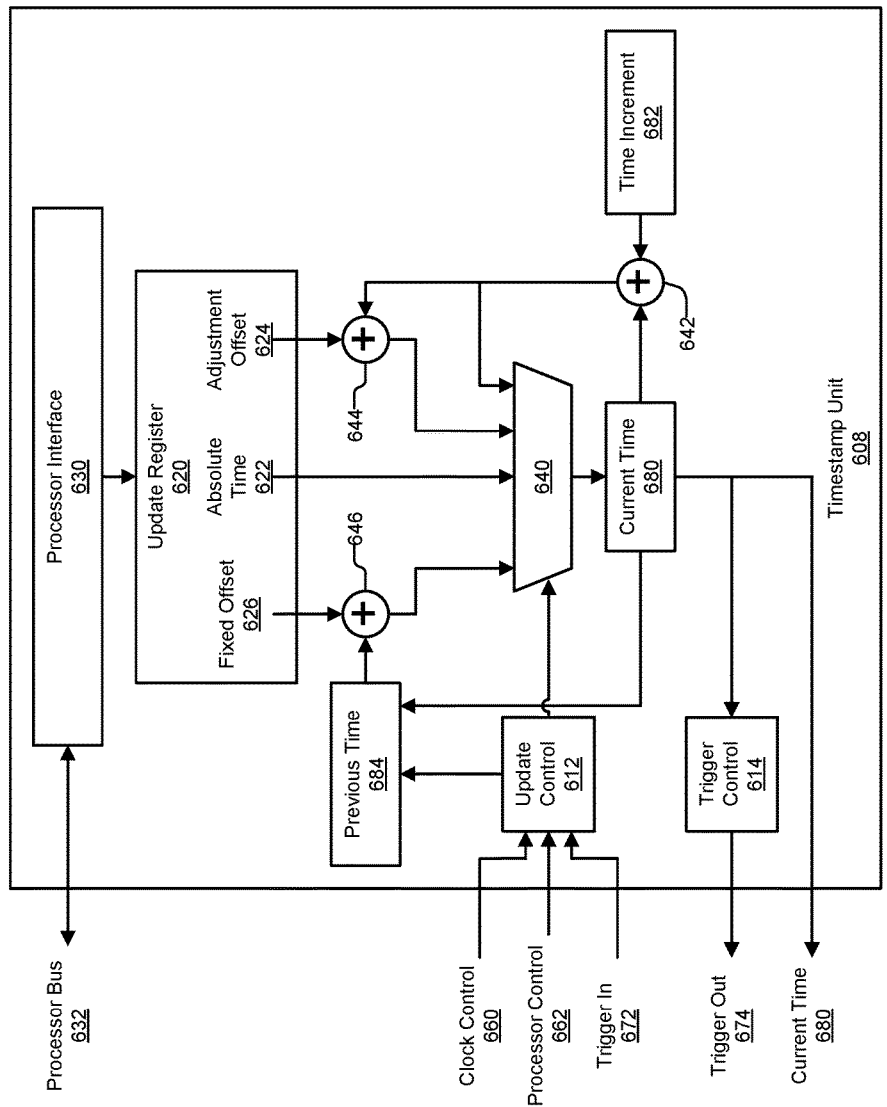
FIG. 6 illustrates a time stamp unit.

FIG. 6 illustrates a time stamp unit 608, which can be used to implement a port time timestamp unit or a device local time timestamp unit. The timestamp unit 608 maintains a current time 680, which can be periodically updated by a time increment 682 value. In various implementations, the current time 608 can also be adjusted using an update register 620. The timestamp unit 608 can include a processor interface 630 for communicating with a processor over a processor bus 632. As discussed further below, the processor can write either an absolute time 622, an adjustment offset 624, or a fixed offset 626 to the update register 620.

Updating of the current time 680 can be controlled by an update control 612 circuit. The update control 612 circuit can base update control decisions on a clock control 660 input, a processor control 662 input, and/or a trigger in 672 signal. The current time 680 can also be used by a trigger control 614 circuit to produce a trigger out 674 signal. The current time 680 can also be output for use as a port time or a device local time.

The current time 680 is a value that can be used to express one or more of a year, month, day, hour, minute, second, and/or fractions of a second (e.g., milliseconds, nanoseconds, femtoseconds, etc.). For example, the current time 680 can be an integer value that represents an offset from a fixed time, such as what is known as the epoch time (zero hours, zero minutes, zero seconds on Jan. 1, 1970). In other examples, the current time 680 can be expressed using multiple integer values, and/or floating point values.

In various implementations, the timestamp unit 608 can update the current time 680 automatically. Using automatic updates, the timestamp unit 608 can update the current time 680 by the time increment 682 value at every clock cycle. The clock cycle, in this instance, is the cycle of a clock input used to drive the time stamp unit 608. The clock input may be derived, for example, from a crystal oscillator in another circuit or device. The frequency of the clock may be in the megahertz (MHz) or gigahertz (GHz) range, such as for example 1 GHz, 5 GHz, 10 GHz, or some other value.

The time increment 682 value may be based in part on the frequency of the input clock and the accuracy level of the current time 680 value. For example, the current time 680 may be counting nanoseconds. In this example, when the input clock frequency is 1 GHz, the time increment 682 value is one nanosecond. As another example, when the input clock frequency is 5 GHz, the time increment 682 value can be ⅕ of a nanosecond, or 200,000 femtoseconds, when the current time 680 is counting nanoseconds. As another example, the current time 680 may be counting femtoseconds. In this example, when the input clock frequency is 1 GHz, the time increment 682 value can be one million femtoseconds. In various implementations, the time increment 682 value can be configurable.

The current time 680 value and the time increment value 682 can be combined using a first adder circuit 642, with the sum being provided to a multiplexer 640. When the timestamp unit 608 is updating the current time 680 automatically, the update control 612 can select the output of the first adder circuit 642 as the input to the current time 680.

In various implementations, the current time 680 value can alternatively be updated to an absolute time 622 value. The absolute time 622 value can be used, for example, when the timestamp unit 608 first powers on or after the timestamp unit 608 has been reset. In these examples, the current time 680 may initialize to all zero or to a random value, or may have an old time value, and may need to be written to bring the current time 608 up to date or close to up to date.

To update the current time to an absolute time 622 value, in various implementations a processor can write the absolute time 622 value into the update register 620. The processor can then use the processor control 662 input to cause the processor control 612 to select the appropriate input to the multiplexer 640. At the next cycle of the input clock the absolute time 622 value can be latched into the current time 680. Alternatively, in some implementations, the current time 680 will latch the absolute time 622 value the next time a time event is received at the trigger in 672 input signal.

In various implementations, the current time 680 value can be adjusted using an adjustment offset 624 value. The adjustment offset 624 value can be used to nudge the current time 680 forwards or backwards, and/or to adjust for an input clock that is consistently too fast or too slow. For example, it may be determined (for example, by a processor), that the current time 680 is ahead by five seconds. In this example, the processor can write a value of negative five into the update register 620, and cause the update control 612 to select the appropriate multiplexer 640 input. The value of negative five can them be added to the output of the first adder circuit 642 using a second adder circuit 644. The processor can further use the processor control input 662 to cause the update control 612 to select the appropriate input to the multiplexer. At the next cycle of the input clock and/or at the next receipt of a trigger in 672 signal, the current time 680 can be updated with the adjustment offset 624.

As another example, the input clock frequency may be running consistently too fast or too slow. Variations in the construction of clock oscillators, differences in electrical voltage, temperature, humidity, and even solar radiation can affect the frequency of the input clock. For example, the input clock frequency may cause the current time 680 to lose three nanoseconds for every ten nanoseconds. Further, in this example, the trigger in 672 input can occur every ten nanoseconds. A processor can thus write a value of three as the adjustment offset 624 value, such that every time the trigger in 672 signal is received, the current time 680 is automatically adjusted up by three seconds.

In various implementations, the current time 680 value can be adjusted using a fixed offset value 626. The fixed offset value 626 is added to a previous time 684 value using a third adder circuit 646. The previous time 684 value is the captured from the current time 680, for example, when the trigger in 672 input receives a time event. The fixed offset value 626 can be used to synchronize the current time 680 to an external source. For example, a GPS receiver may output a signal every one microsecond. In this example, a processor can write a value of one microsecond to the update register 620. The trigger in 672 input can further toggle at every one microsecond, so that the previous time 684 is added to the fixed offset 626. The clock control 660 and/or the processor control 662 inputs can further cause the update control 612 to select the appropriate multiplexer 640 input.

In various implementations, when the timestamp unit 608 is used in a time recipient port to maintain a port time, the current time 680 can be initialized using an absolute time 622. Thereafter, an adjustment offset 624 value can be used to adjust the current time 680 to be similar to the time of the time provider. In various implementations, when the timestamp unit 608 is used in a time provider port to maintain a port time, the current time 680 can also be adjusted using an absolute time 622. Thereafter, the current time 680 can be adjusted using the fixed offset 626, to adjust the current time 680 relative to the port that is providing the time.

The current time 680 can further be used by the trigger control 614 circuit to produce time events, which can be sent over the trigger out 674 signal. The time events can be used to synchronize other timestamp units to the current time 680 of this timestamp unit 608. Time events can indicate, for example, that the current time 680 has incremented by an interval of 1 nanosecond, 10 nanoseconds, 1 millisecond, or some other value. In some implementations, time events can be encoded using two, three, four (or more) bit values, where a particular encoding can indicate that the current time 680 has incremented by 1, 10, or some other number of nanoseconds or milliseconds. In some implementations, the meaning of a time event can be configurable.

Figure 7:
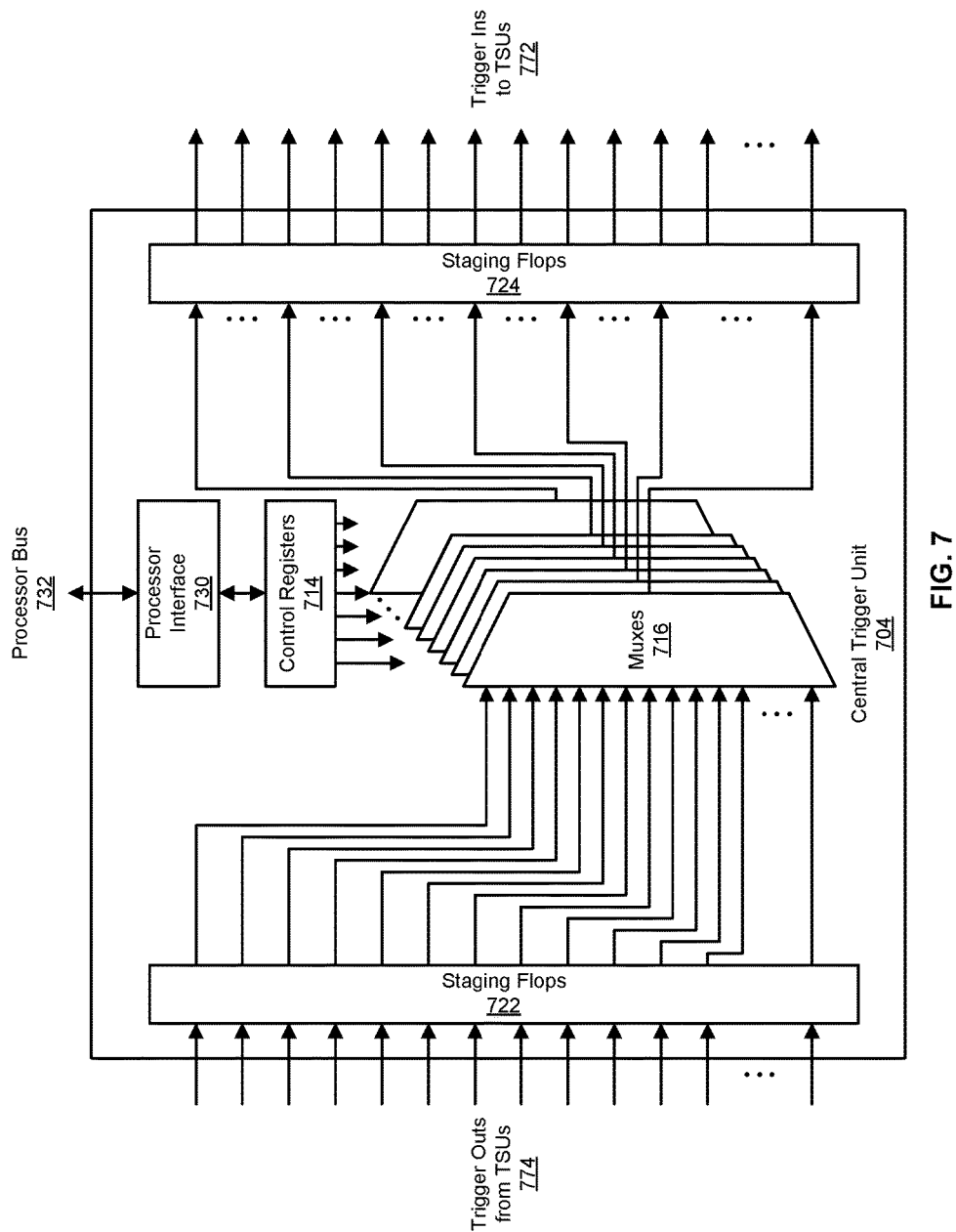
FIG. 7 illustrates an example of a central trigger unit.

FIG. 7 illustrates an example of a central trigger unit 704, which may also be referred to as a switching circuit. The example central trigger unit 704 includes a number of multiplexers 716 (muxes) that enable any trigger out 774 signal to be connect to any trigger in 772 signal. The central trigger unit 704 can receive as inputs trigger out 774 signals from each of the timestamp units in a network device. The central trigger unit 704 can further drive the trigger in 772 signals input into each of the timestamp units in the network device. The trigger out 774 signals can optionally be received at a set of input staging flops 722, and the trigger in 772 signals can optionally be provided by a set of output staging flops 724. The input 722 and output 724 staging flops can be included in cases where the central trigger unit 704 is used as a pipeline stage, or is otherwise a clock-driven circuit. Without the input 722 and output 724 staging flops, the central trigger unit 704 can function as a combinatorial circuit.

The central trigger unit 704 can also include a processor interface 730 for communicating with a processor bus 732. Using the processor interface 730, the central trigger unit 704 can receive write transactions and read transactions from a processor. The processor transactions may write to or read from control registers 714 in the central trigger unit 704. In various implementations, the control registers 714 can store the configuration settings for the multiplexers 716.

The multiplexers 716 can receive each of the trigger out 774 signals. Using the control registers 714, the multiplexers 716 can be configured to connect any of the trigger out 774 signals to any of the trigger in 772 signals. For example, a particular port of a network device may be designated as a time recipient port, and receive the network time from another device. Also in this example, a set of ports of a network device may be designated as time provider ports, and together the time recipient port and the time provider ports are part of the same time synchronization tree. To support this time synchronization tree, the multiplexers 716 can be configured to connect the trigger out 774 signal from the time recipient port to the trigger in 772 signals to each of the time provider ports. Additional time synchronization trees can be supported in the same way, at the same time. For example, one or more of the trigger out 774 signals may be from time recipient ports, and can be connected to the trigger in 772 signals to sets of respective time provider ports.

One or more of the trigger in 772 signals can also be inputs to timestamp units that each maintain a device local time. For example, each of the ports of the network device may maintain the device local time. As another example, other circuits in the network device may maintain the device local time for their own use. As another example, a local processor may maintain the device local time for its own purposes. The multiplexers 716 can thus be configured to connect any of the trigger out 774 signals to the trigger in 772 signals for each of (in the above example) the device local timestamp units in the ports, the device local time stamp unit in the other circuits, and the local processor. The trigger out 774 signal connected to these trigger in 772 signals can be from the port that is currently the time recipient port for the device, and can be changed whenever the time recipient port is changed to another port.

In various implementations, the central trigger unit 704 can also include interrupt pins (not illustrated here) that can be used to send interrupts to a local processor. In various implementations, the interrupts can be used, for example, to generate periodic interrupts to the local processor.

Figure 8:
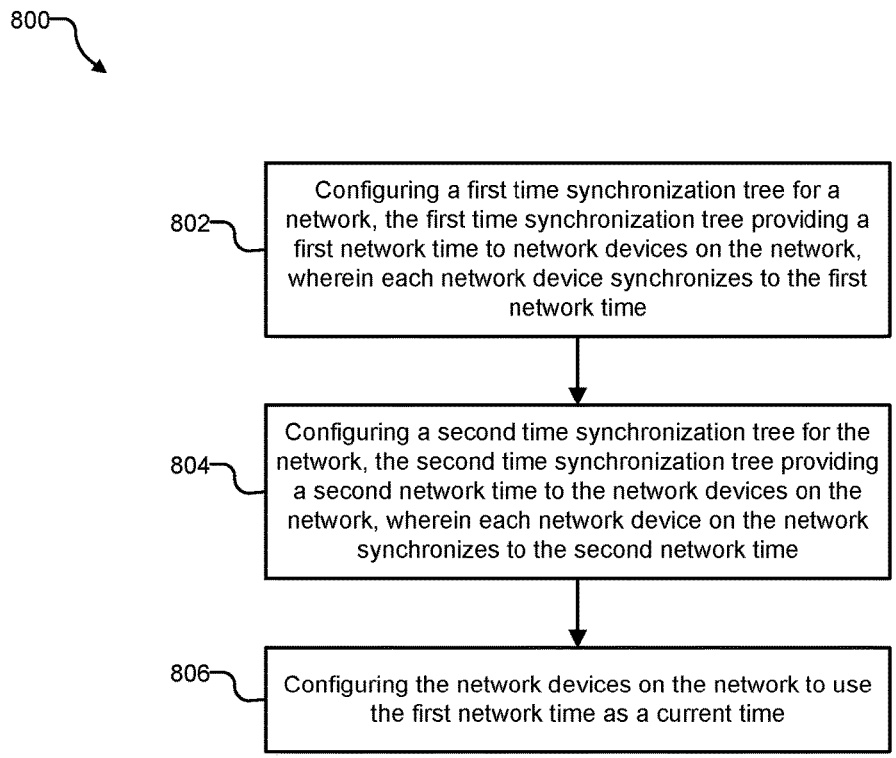
FIG. 8 illustrates an example of a process for configuring a network according to a reliable precision time architecture.
Figure 9:
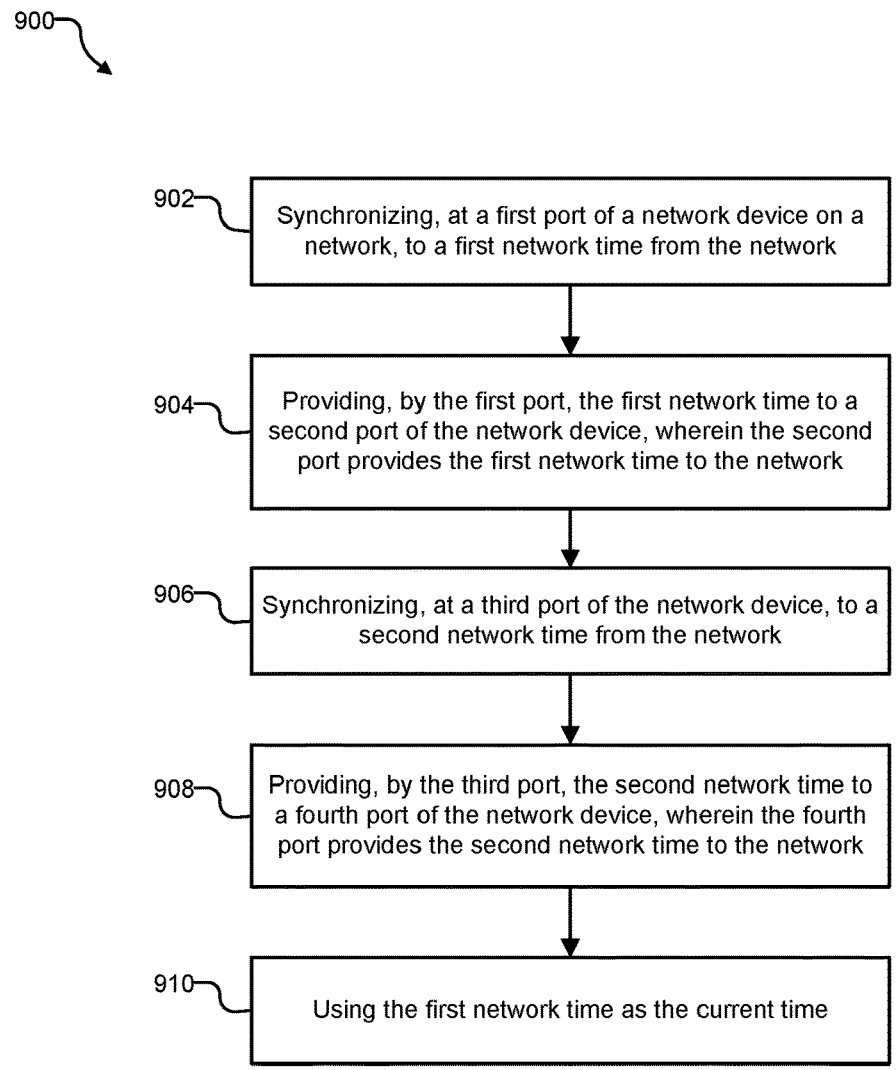
FIG. 9 illustrates an example of a process for implementing a reliable precision time architecture in a network device.

FIGS. 8-9 illustrate examples of methods for implementing a reliable precision time architecture. These methods may be implemented by the systems described above, such as for example the networks illustrated in FIGS. 1A-1E and FIG. 2, and/or the network device illustrated in FIG. 3.

FIG. 8 illustrates an example of a process 800 for configuring a network according to a reliable precision time architecture. In various implementations, the example process 800 can be executed, for example, by a network configuration device in the network. The network configuration device can be, for example, a server computer, a desktop computer, a laptop computer, a handheld computer, a switch, a router, a gateway device, or a network controller, among other things.

At step 802, the process 800 includes configuring a first time synchronization tree for a network, the first time synchronization tree providing a first network time to network devices on the network. Each network device further synchronizes to the first network time. In various implementations, synchronizing to a time synchronization tree can include identifying a timekeeper network device on the network. The timekeeper network device can provide a network time. The timekeeper network device can be, for example, a host device that includes or is attached to a highly accurate clock source (e.g., an atomic clock or a GPS receiver). As another example, the timekeeper network device can be a network infrastructure device, such as a switch or router, which can obtain the time from a local processor or from a control plane.

Configuring a time synchronization tree can further include determining a single path through the network from the timekeeper network device to each other network device in the network. Each network device can use a such a path to synchronize to the network time.

In various implementations, a network device can synchronize to a network time by synchronizing with a neighboring network device. The network device and the neighboring network device share a link, and use this link to exchange packets. The network has further been configured to include this link in a time synchronization tree. Hence, some of these packets exchanged over the link can be network messages for synchronizing to a common, network time. In various implementations, a network device synchronizes to a network time by adjusting an internal time to be similar to the network time.

At step 804, the process 800 includes configuring a second time synchronization tree for the network, the second time synchronization tree providing a second network time to the network devices in the network. Each network device on the network synchronizes to the second network time, while at the same time synchronizing to the first network time. In various implementations, the second time synchronization tree uses different paths, or, as best as possible, uses different paths, through the network than are used by first time synchronization tree.

At step 806, the process 800 includes configuring the network devices on the network to use the first network time as the current time. The network devices may use the first network time for internal and external purposes, such as measuring latency within a network device and/or latency across the network.

In various implementations, an event may occur in the network, upon which a network device on the network may determine to use the second network time as the current time. The event may be, for example, a link failure in a link that connects the network device to a neighboring network device. In this example, failed link may be one used by the first time synchronization tree to provide the time to the network device. As another example, the event may be a message being received by the network device. In this example, the message may instruct the network device to use the second network time. In these and other examples, the network device is, as provided in step 804, already synchronized to the second network time, and can use the second network time by executing an internal reconfiguration.

FIG. 9 illustrates an example of a process 900 for implementing a reliable precision time architecture in a network device.

At step 902, the process 900 includes synchronizing, at a first port of the network device, to a first network time from the network. The first network time may be provided as a result of a first time synchronization tree being configured for the network. In various implementations, synchronizing to a network time can include synchronizing with a neighboring network device. The neighboring network device shares a link with the network device, and the neighboring network device can provide the network time over the link. Synchronizing with the neighboring network device can further include an exchange of network messages between the network device and the neighboring network device. The network device can further adjust a port time, which is maintained by the port that shares the link with the neighboring network device (e.g., the first port) to be similar to the network time.

At step 904, the process 900 includes providing, by the first port, the first network time to a second port of the network device. The second port can further provide the first network time to another network device in the network. In various implementations, receiving a network time at a port (e.g., the second port) can include receiving, from a port providing the network time (e.g., the first port), a time synchronization signal. When the time receiving port receives the time synchronization signal, the port can adjust a port time maintained by the port to be similar to a port time maintained by the port providing the network time.

At step 906, the process 900 includes synchronizing, at a third port of the network device, to a second network time from the network. The second time may be provided through a second time synchronization tree that is configured for the network. Synchronizing at the third port can include adjusting a port time maintained by the third port to be similar to the second network time.

At step 908, the process 900 includes providing, by the third port, the second network time to the fourth port of the network device. The fourth port can further provide the second network time to another network device on the network. To provide the second network time to the fourth port, the third port can output a time synchronization signal. When the fourth port receives the time synchronization signal, the fourth port can adjust a port time maintained by the fourth port to be similar to the second network time.

At step 910, the process 900 includes using the first network time as the current time. Using a network time as the current time can include synchronizing a device local time unit to the network time. The device local time unit can provide the current time to the network device. Synchronizing the device local time unit can further include receiving, by the device local time unit, a time synchronization signal. When the network device is using the first network time, the time synchronization signal can come from the first port. When the network device is using the second network time the time synchronization signal can come from the third port. Upon receiving the time synchronization signal, the device local time unit can adjust the current time to be similar to the network time.

In various implementations, each port of the network device includes a device local time unit. Each port can further use the current time provided by the device local time units to generate timestamps. In various implementations, the network device can also include a packet processing circuit. The packet processing circuit can also include a device local time unit, which the packet processing circuit can use to generate timestamps.

In various implementations, an event may occur that causes the network device to use the second network time instead of the first network time as the current time. The event can be, for example, a link failure, such as at the link connecting the first port to a neighboring network device. As another example, an event can be the receipt of a message, instructing the network device to use the second network time.

When the network device is using the second network time due to a link failure, the network device can also provide the second network time to the second port, which otherwise would be receiving the first network time from the first port. Because the link failure may make the first network time unavailable, the second port can instead provide the second network time to another network device.

Figure 10:
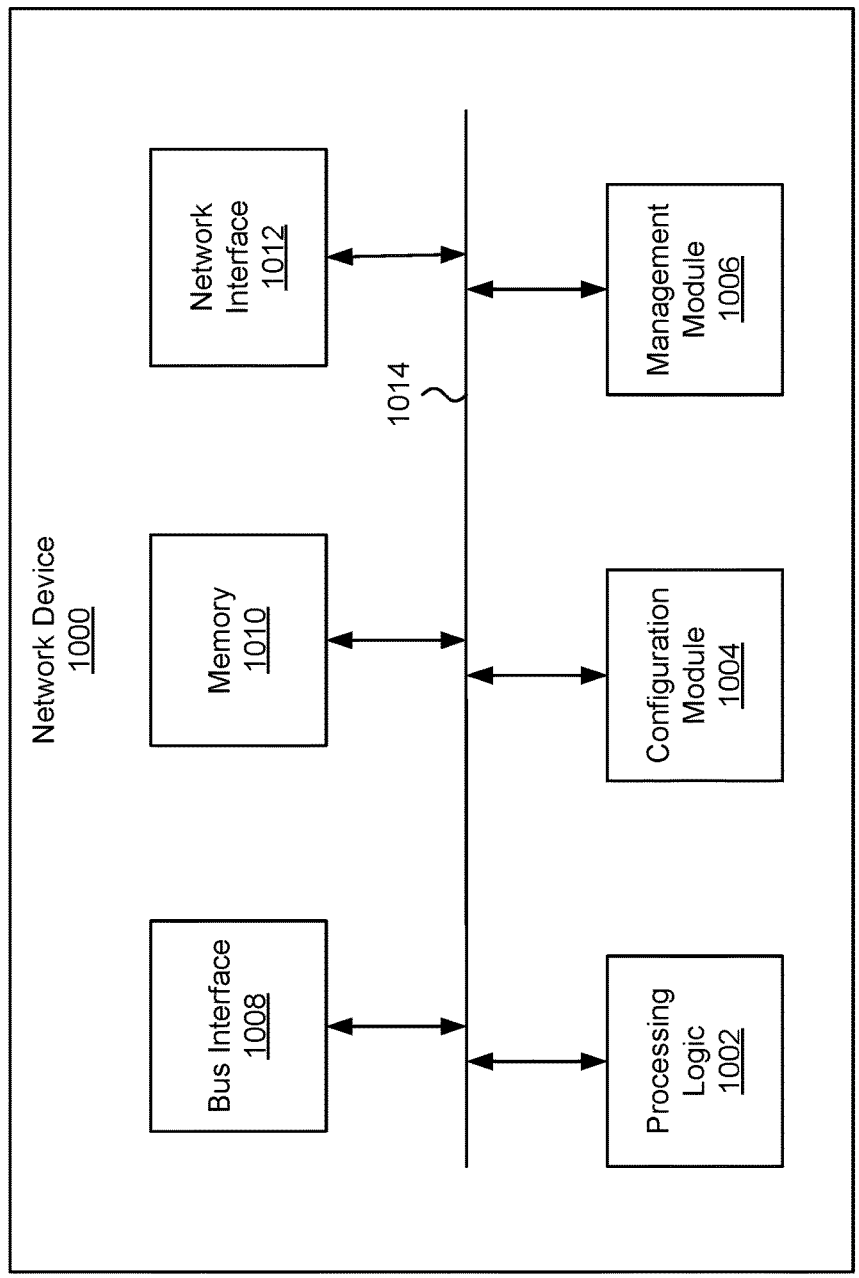
FIG. 10 illustrates an example of a network device, according to certain aspects of the disclosure.

FIG. 10 illustrates an example of a network device 1000. Functionality and/or several components of the network device 1000 may be used without limitation with other embodiments disclosed elsewhere in this disclosure, without limitations. A network device 1000 may facilitate processing of packets and/or forwarding of packets from the network device 1000 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1000 may be the recipient and/or generator of packets. In some implementations, the network device 1000 may modify the contents of the packet before forwarding the packet to another device. The network device 1000 may be a peripheral device coupled to another computer device, a switch, a router or any other suitable device enabled for receiving and forwarding packets.

In one example, the network device 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The network device 1000 may include additional modules, not illustrated here, such as components discussed with respect to the nodes disclosed in FIG. 11. In some implementations, the network device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the network device 1000, while in other cases some or all of the memory may be external to the network device 1000. The memory 1010 may store an operating system comprising executable instructions that, when executed by the processing logic 1002, provides the execution environment for executing instructions providing networking functionality for the network device 1000. The memory may also store and maintain several data structures and routing tables for facilitating the functionality of the network device 1000.

In some implementations, the configuration module 1004 may include one or more configuration registers. Configuration registers may control the operations of the network device 1000. In some implementations, one or more bits in the configuration register can represent certain capabilities of the network device 1000. Configuration registers may be programmed by instructions executing in the processing logic 1002, and/or by an external entity, such as a host device, an operating system executing on a host device, and/or a remote device. The configuration module 1004 may further include hardware and/or software that control the operations of the network device 1000.

In some implementations, the management module 1006 may be configured to manage different components of the network device 1000. In some cases, the management module 1006 may configure one or more bits in one or more configuration registers at power up, to enable or disable certain capabilities of the network device 1000. In certain implementations, the management module 1006 may use processing resources from the processing logic 1002. In other implementations, the management module 1006 may have processing logic similar to the processing logic 1002, but segmented away or implemented on a different power plane than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the network device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1000 may include multiple network interface modules, each configured to communicate with a different network. For example, in these implementations, the network device 1000 may include a network interface module for communicating with a wired Ethernet network, a wireless 802.11 network, a cellular network, an Infiniband network, etc.

The various components and modules of the network device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 11.

Figure 11:
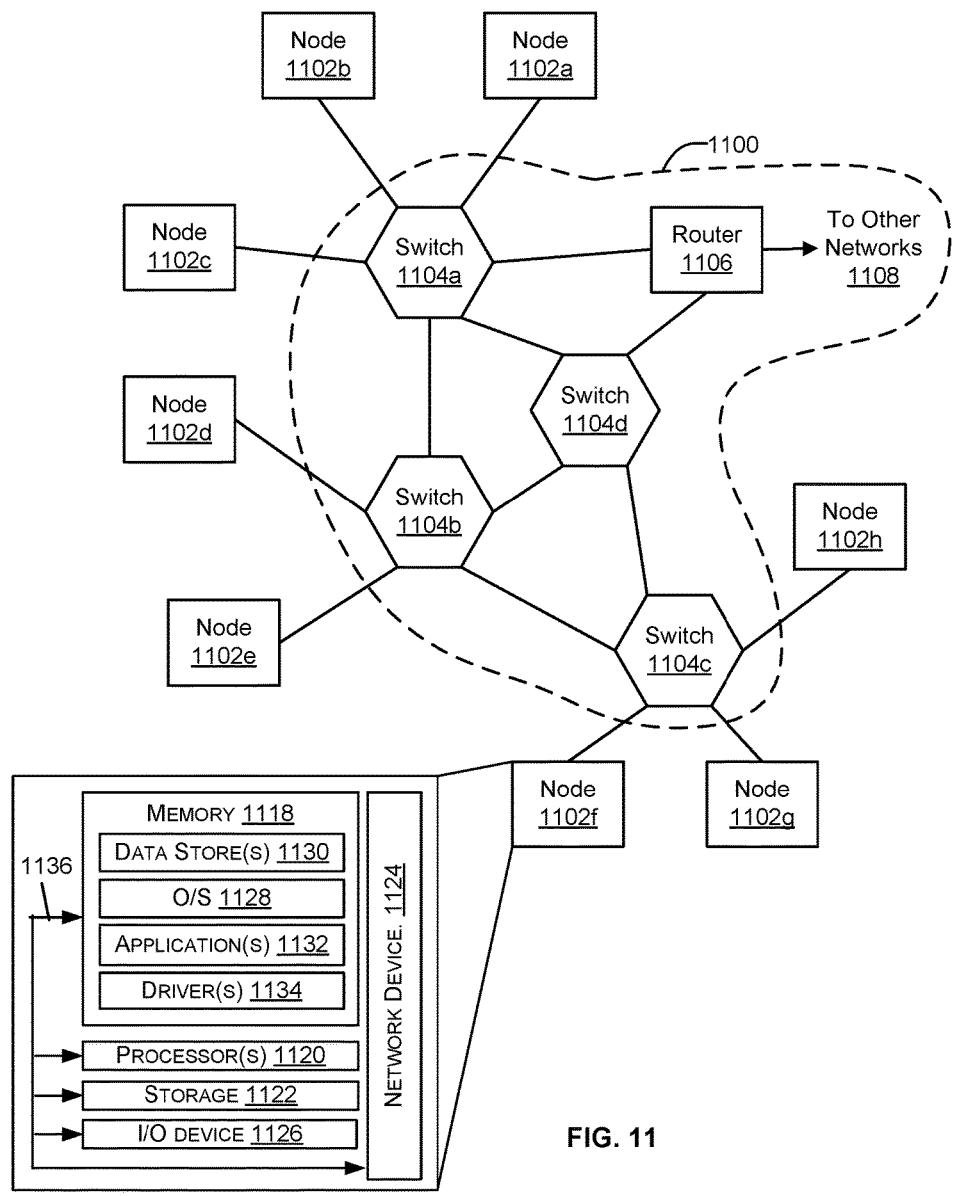
FIG. 11 illustrates an example architecture for features and systems described herein that includes one or more service provider computers and/or a user device connected via one or more networks, according to certain aspects of the disclosure.

FIG. 11 illustrates a network 1100, illustrating various different types of network devices 1000 of FIG. 10, such as nodes comprising the network device, switches and routers. In certain embodiments, the network 1100 may be based on a switched architecture with point-to-point links. As illustrated in FIG. 11, the network 1100 includes a plurality of switches 1104a-1104d, which may be arranged in a network. In some cases, the switches are arranged in a multi-layered network, such as a Clos network. A network device 1000 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1104a-1104d may be connected to a plurality of nodes 1102a-1102h and provide multiple paths between any two nodes.

The network 1100 may also include one or more network devices 1000 for connection with other networks 1108, such as other subnets, LANs, wide area networks (WANs), or the Internet, and may be referred to as routers 1106. Routers use headers and forwarding tables to determine the best path for forwarding the packets, and use protocols such as internet control message protocol (ICMP) to communicate with each other and configure the best route between any two devices.

In some examples, network(s) 1100 may include any one or a combination of many different types of networks, such as cable networks, the Internet, wireless networks, cellular networks and other private and/or public networks. Interconnected switches 1104a-1104d and router 1106, if present, may be referred to as a switch fabric, a fabric, a network fabric, or simply a network. In the context of a computer network, terms "fabric" and "network" may be used interchangeably herein.

Nodes 1102a-1102h may be any combination of host systems, processor nodes, storage subsystems, and I/O chassis that represent user devices, service provider computers or third party computers.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein.

The operating system 1128 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices 1104. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1124 that allow the node(s) 1102a-1102h to communicate with a stored database, another computing device or server, user terminals and/or other devices on the network(s) 1100. The network device(s) 1124 of FIG. 11 may include similar components discussed with reference to the network device 1000 of FIG. 10.

In some implementations, the network device 1124 is a peripheral device, such as a PCI-based device. In these implementations, the network device 1124 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1008 may implement NVMe, and the network device 1124 may be connected to a computing system using a PCIe interface.

A PCI-based device may include one or more functions. A "function" describes operations that may be provided by the network device 1124. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1124 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, FIG. 11, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
a plurality of network devices connected to a network;
wherein the system is operable to:
configure a first time synchronization tree for the network, wherein configuring the first time synchronization tree includes:
identifying a first network device in the network, the first network device providing a first network time for the network; and
determining one or more paths through the network from the first network device to each other network device in the network, wherein, for each of the other network devices, the one or more paths include a single path from the other network device to the first network device, and wherein the other network devices each use the one or more paths to synchronize to the first network time; and
configure a second time synchronization tree for the network, wherein configuring the second time synchronization tree includes:
identifying a second network device in the network, the second network device providing a second network time for the network; and
determining one or more alternate paths through the network from the second network device to each of the other network devices in the network, wherein, for each of the other network devices, the one or more alternate paths include a single alternate path from the other network device to the second network device, wherein the other network devices each use the one or more alternate paths to synchronize to the second network time; and
configure each of the plurality of network devices to use the first network time as a current time, wherein the first network time and the second network time are simultaneously available to each of the plurality of network devices, and wherein each of the plurality of network devices simultaneously synchronizes to the first network time and the second network time.

2. The system of claim 1, wherein, upon a failure of a link that is included in a path from the one or more paths, a network device adjacent to the link that failed determines to use the second network time as the current time.

3. The system of claim 1, wherein a network device on the network synchronizes to the first network time by synchronizing with a first neighboring network device, wherein the network device and the first neighboring network device share a link in the one or more paths in the first time synchronization tree, wherein the network device synchronizes to the second network time by synchronizing with a second neighboring network device, and wherein the network device and the second neighboring network device share a link in the one or more alternate paths in the second time synchronization tree.

4. The system of claim 1, wherein the first time synchronization tree and the second time synchronization tree are configured by a network configuration device on the network.

5. A method, comprising:
configuring, by a network configuration device on a network, a first time synchronization tree for the network, the first time synchronization tree providing a first network time to network devices on the network, wherein each network device on the network synchronizes to the first network time;
configuring a second time synchronization tree for the network, the second time synchronization tree providing a second network time to the network devices on the network, wherein each network device on the network synchronizes to the second network time; and
configuring the network devices on the network to use the first network time as a current time, wherein the first network time and the second network time are simultaneously available to each network device, and wherein each network device on the network simultaneously synchronizes to the first network time and the second network time.

6. The method of claim 5, wherein configuring the first time synchronization tree or the second time synchronization tree includes:
identifying a timekeeper network device on the network, wherein the timekeeper network device provides a network time; and
determining a single path through the network from the timekeeper network device to a network device in the network, wherein the network device uses the single path to synchronize to the network time.

7. The method of claim 6, wherein the timekeeper network device includes an atomic clock or a satellite navigation system receiver.

8. The method of claim 6, wherein the timekeeper network device receives the network time from a control plane.

9. The method of claim 5, wherein a network device in the network synchronizes to the first network time by synchronizing with a neighboring network device, wherein the network device and the neighboring network device share a link, wherein the link is included in the first time synchronization tree, wherein a network time is provided by the first time synchronization tree.

10. The method of claim 9, wherein the network device and the neighboring network device synchronize using an exchange of network messages.

11. The method of claim 5, wherein a network device on the network synchronizes to a network time by adjusting an internal time to be similar to the network time, wherein the internal time is maintained by the network device.

12. The method of claim 5, wherein, upon occurrence of an event, a network device on the network determines to use the second network time as the current time.

13. The method of claim 12, wherein the event includes failure of a link adjacent to the network device, wherein the link is included in the first time synchronization tree, and wherein the network device uses the link to receive the first network time.

14. The method of claim 12, wherein the event includes receipt of a message, wherein the message instructs the network device to use the second network time.

15. The method of claim 5, wherein the first network time and the second network time are provided by a timekeeper network device.

16. The method of claim 5, wherein network devices in the network include one or more host devices and one or more network infrastructure devices.

17. The method of claim 5, wherein the first network time and the second network time include a date, an hour, a minute, a second, and a fraction of a second.

18. A non-transitory computer-readable storage medium including instructions that, when executed by one or more processors, cause the one or more processors to perform operations including:
- configuring a first time synchronization tree for a network, the first time synchronization tree providing a first network time to network devices on the network, wherein each network device on the network synchronizes to the first network time;
- configuring a second time synchronization tree for the network, the second time synchronization tree providing a second network time to the network devices on the network, wherein each network device on the network synchronizes to the second network time;
- configuring the network devices on the network to use the first network time as a current time; and
- configuring each device on the network to simultaneously synchronize to the first network time and the second network time.

19. The non-transitory computer-readable storage medium of claim 18, wherein configuring the first time synchronization tree or the second time synchronization tree comprises:
- identifying a timekeeper network device on the network for providing a network time; and
- determining a single path through the network from timekeeper network device to a network device in the network, wherein the network device uses the single path to synchronize to the network time.

20. The non-transitory computer-readable storage medium of claim 18, further comprising instructions that, when executed by the one or more processors, cause the one or more processors to perform operations including:
- determining that a link has failed, wherein the link is included in the first time synchronization tree, wherein a network device adjacent to the link receives the first network time using the link, and wherein, based on failure of the link, the network device uses the second network time as the current time; and
- configuring a third time synchronization tree for the network, the third time synchronization tree providing a third network time to network devices on the network, wherein each network device on the network synchronizes to the third network time, and wherein the third time synchronization tree bypasses the link that failed.

21. The non-transitory computer-readable storage medium of claim 18, further comprising instructions that, when executed by the one or more processors, cause the one or more processors to perform operations including:
- determining that a link has failed, wherein the link is included in the first time synchronization tree, wherein a network device adjacent to the link receives the first network time using the link, and wherein, based on failure of the link, the network device uses the second network time as the current time; and
- reconfiguring the first time synchronization tree to bypass the link that failed.

22. The non-transitory computer-readable storage medium of claim 18, further comprising instructions that, when executed by the one or more processors, cause the one or more processors to perform operations including:
- determining that a new network device has been added to the network;
- configuring the first time synchronization tree to include the new network device; and
- configuring the second time synchronization tree to include the new network device.

* * * * *